US 7,414,819 B2

(12) United States Patent
Lee et al.

(10) Patent No.: US 7,414,819 B2
(45) Date of Patent: Aug. 19, 2008

(54) METHODS AND SYSTEMS FOR SECTIONALIZING A LOOPED DISTRIBUTION LINE IN A POWER DISTRIBUTION SYSTEM

(75) Inventors: Tony J. Lee, Pullman, WA (US); David Keckalo, Spokane, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 466 days.

(21) Appl. No.: 11/003,796

(22) Filed: Dec. 3, 2004

(65) Prior Publication Data

US 2006/0119999 A1  Jun. 8, 2006

(51) Int. Cl.
*H02H 3/00* (2006.01)
(52) U.S. Cl. .......................... 361/61; 361/75
(58) Field of Classification Search ............. 361/62–69, 361/71, 72, 61, 73, 75
See application file for complete search history.

(56) References Cited

U.S. PATENT DOCUMENTS

| | | | |
|---|---|---|---|
| 4,994,934 A | | 2/1991 | Bouhenguel |
| 5,097,380 A | | 3/1992 | Moran |
| 5,237,511 A | | 8/1993 | Caird et al. |
| 5,303,112 A | | 4/1994 | Zulaski et al. |
| 5,373,411 A | | 12/1994 | Grass et al. |
| 5,513,061 A | * | 4/1996 | Gelbien et al. ................. 361/63 |
| 5,629,825 A | | 5/1997 | Wallis et al. |
| 5,896,302 A | * | 4/1999 | Goodpaster ................. 700/292 |
| 5,973,899 A | * | 10/1999 | Williams et al. ............... 361/72 |
| 6,005,759 A | | 12/1999 | Hart et al. |
| 6,008,971 A | | 12/1999 | Duba et al. |
| 6,212,049 B1 | | 4/2001 | Spencer et al. |
| 6,239,960 B1 | | 5/2001 | Martin |
| 6,341,054 B1 | | 1/2002 | Walder et al. |
| 6,459,998 B1 | | 10/2002 | Hoffman |
| 6,549,880 B1 | | 4/2003 | Willoughby et al. |
| 6,577,963 B1 | | 6/2003 | Cordray et al. |
| 6,667,866 B1 | | 12/2003 | LaPlace et al. |
| 6,704,181 B2 | | 3/2004 | Saksa |
| 6,707,655 B2 | | 3/2004 | McElray, Sr. et al. |
| 6,816,757 B1 | | 11/2004 | De La Ree et al. |
| 2002/0101695 A1 | | 8/2002 | Saksa |
| 2002/0131222 A1 | | 9/2002 | McClure et al. |

OTHER PUBLICATIONS

Cooper Power Systems, Type LS Loop Sectionalizing Control Installation and Operation Instructions, Apr. 2001, 20 pgs., Waukesha, Wisconsin.
Cooper Power Systems, Form 6-LS Pole Mount Recloser Control Installation and Operation Instructions, Dec. 2004, 48 pgs., Pewaukee, Wisconsin.

* cited by examiner

*Primary Examiner*—Michael J Sherry
*Assistant Examiner*—Danny Nguyen
(74) *Attorney, Agent, or Firm*—Eugene M. Cummings, P.C.

(57) ABSTRACT

A plurality of preprogrammed switches is disposed in a looped distribution line downstream from a source of power to respond to a short circuit and to reconfigure the line to isolate the short circuit. Some of the preprogrammed switches are each provided with a unique open time interval, such as t1, t2 and t3. Others of the plurality of preprogrammed switches can then determine which switch is opening in response to the short circuit and can identify the portion of the line that is shorted. Certain of the preprogrammed switches can then reconfigure to protect the identified portion of the line.

31 Claims, 12 Drawing Sheets

METHODS AND SYSTEMS FOR SECTIONALIZING A LOOPED DISTRIBUTION LINE IN A POWER DISTRIBUTION SYSTEM

FIELD OF THE INVENTION

The present invention relates generally to electric power distribution systems. More particularly, the invention relates to such electric power distribution systems that utilize loop sectionalizing for improvement in responding to short circuits on distribution lines.

BACKGROUND OF THE INVENTION

A. General

Reference is frequently made herein to circuit breakers, sectionalizers, and reclosers. All of these devices are designed to switch distribution circuits on and off by opening or closing switches therein. Typically modern breakers, sectionalizers, and reclosers do not contain any means to determine when or if they should open or close. Instead these devices are attached to control devices which measure power system currents and/or voltages, and send signals to the reclosers, sectionalizers, and circuit breakers to open and close. The methods described below, which decide when to open and close the circuit breakers, sectionalizers, and reclosers, are typically implemented in these control devices. The usual practice in the art is to refer to a device that controls a circuit breaker as a protective relay. Similarly, a device that controls a recloser is typically referred to as a recloser control and a device that controls a sectionalizer is typically referred to as a sectionalizer control.

Thus, even though reclosers, sectionalizers, and breakers are frequently referred to herein as measuring current, sensing short circuit current, measuring voltage, and sensing when a line is energized or deenergized, it will be readily apparent to those skilled in the art that the control device associated with each circuit breaker, recloser, or sectionalizer is actually performing the measurements, detecting short circuits or line energization states, and making the decision to open and close the connected recloser, sectionalizer, or circuit breaker. Thus, when a circuit breaker, recloser, and/or sectionalizer is referred to herein, it means the combination of recloser and recloser control, sectionalizer and sectionalizer control, and circuit breaker and protective relay.

B. Power Distribution Systems with Radial Distribution Lines

Electric power distribution typically occurs at voltages in the range 4 kV to 35 kV. Historically, distribution lines were connected radially from distribution substations to loads. The prior art example of FIG. 1 illustrates a system 21 with a single distribution line 20 feeding several loads, Load 1 through Load 4, from a distribution substation 22. Usually several distribution lines radiate from the substation 22, but for simplicity, only one distribution line 20 is shown in FIG. 1.

A short circuit on such a radial line typically causes a power outage for all connected loads in a radial distribution system. Inside the substation 22 is a circuit breaker 24 that helps protect the distribution line 20 from short circuits. If a short circuit occurs anywhere on the line, then large currents will begin to flow from the substation 22 to the short circuit on the distribution line 20. Over-current detecting equipment, called protective relays, will detect the large current and will signal the circuit breaker 24 to open. When the circuit breaker 24 opens, the distribution line 20 is disconnected from the power source within the substation 22. This interrupts power to all of the loads, Load 1 through Load 4, connected to the radial distribution line 20. The loads then remain without power until a line crew travels to the site of the short circuit, repairs the short-circuited conductors, and then closes the circuit breaker 24. The duration of such a power outage is typically several hours.

Power can be restored to the loads faster after temporary short circuits by reclosing the circuit breaker. Still referring to FIG. 1, many short circuits are transient in nature. If the short-circuited line is disconnected from the power source by the circuit breaker 24, temporary short circuits can be self-healed. When the circuit breaker 24 recloses, the short circuit will be gone, and power will be restored to the loads immediately without the need to dispatch a line crew to repair the short circuit. This returns power to the loads faster, in a matter of seconds instead of hours.

Of course, there is no guarantee that the short circuit is temporary, and it may still be present when the circuit breaker closes. In that case, the circuit breaker 24 is again opened, and may be reclosed one or more additional times testing to see if the short circuit has self-healed. If the short circuit goes away, then the breaker remains closed. If the short circuit is permanent, then the breaker 24 opens a predetermined number of times, waiting a predetermined time between each closing, and then opens a final time and remains open. Again all of the connected loads are without power until a line crew locates and repairs the short circuit, and the circuit breaker is closed. This can take several hours. Since some portion of faults are temporary, reclosing of the circuit breaker 24 decreases the chances that a load will be without power for several hours, and increases the chance that the load will be without power for only a few seconds.

Sectionalizers and reclosers can be used to limit the size of the power outages caused by permanent short circuits. Some distribution lines are constructed with switches along the length of the line, as shown in FIG. 2. In particular, in FIG. 2, a system 23 with a sectionalizer switch 26 allows power to be restored to some loads faster. First, the operation of sectionalizer switches will be discussed, and then the operation of line reclosers will be discussed. Both reclosers and sectionalizers historically have the ability to measure the current flowing through the switch, and the voltage at least on one side of the switch. When the voltage is measured on only one side of the switch (the usual case), it is measured on the side of the switch closer to the sub-station 22 or to the power source.

The switch 26, also marked S, in FIG. 2 is a sectionalizer switch. It measures current flowing through the switch, and the voltage on the left (substation or power source) side of the switch. If a short circuit occurs between the substation 22 and the sectionalizer switch 26, the system of FIG. 2 behaves the same as the system of FIG. 1. If a short circuit 28 occurs between the sectionalizer switch 26 and the end of the distribution line 20 then the system of FIG. 2 acts differently than the system of FIG. 1. This short circuit 28 is said to be "down stream" of the sectionalizer 26.

The short circuit causes a large current to flow from the power source in the substation 22, through the substation circuit breaker 24, along the distribution line 20, through the sectionalizer switch 26, and to the short circuit 28. The sectionalizer 26 senses the large current flow, and then "knows" that the short circuit 28 is down stream from the sectionalizer location. If the short circuit location were upstream of the sectionalizer location, then the sectionalizer switch 26 would not have detected the large current.

As with the system 21 of FIG. 1, the circuit breaker 24 in the substation 22 opens and removes power from the distribution line 20, all of the connected loads, Load 1 through Load 4, and from the short circuit 28. This causes the voltage along the distribution line 20 to drop from several thousand volts to substantially zero volts. The sectionalizer 26 senses the absence of voltage, and "knows" that the substation breaker 24 has opened. The substation breaker 24 may be programmed to test several times for a temporary short circuit before finally opening and staying open if the short circuit 28 is permanent. The sectionalizer switch 26 counts each time the substation breaker 24 closes and opens. The sectionalizer 26 does this by sensing the short circuit current flowing through the sectionalizer switch when the substation breaker 24 closes, and senses the absence of voltage when the substation breaker 24 opens.

The sectionalizer switch S is programmed to open during one of the "open-intervals" of the substation breaker 24. This open-interval is the time when the substation breaker 24, or any device, is open. During some pre-determined open interval, the sectionalizer opens.

When the substation breaker 24 recloses with the sectionalizer switch open, there will be no large current flow because the short circuit 28 has been isolated from the power source by the open condition of the sectionalizer switch 26. The circuit breaker 24 will then remain closed. In other words, the sectionalizer switch 26 made the permanent short circuit 28 shown in FIG. 2 appear to be a temporary short circuit. The result is that after the substation breaker 24 closes, power is restored to Load 1 and Load 2 after just a few seconds, even though the short circuit 28 is permanent. Only the customers at Load 3 and at Load 4 will experience an extended power outage while the line crew searches for and repairs the short circuit 28. After the short circuit is repaired, the sectionalizer switch 26 is closed, and power returns to Load 3 and Load 4. This is an improvement over the system of FIG. 1 where a permanent short circuit caused an extended power outage for all of the loads.

FIG. 3 illustrates a system 27 with a recloser 30, also marked R, in place of the sectionalizer 26 in the system 23 of FIG. 2. This line recloser 30 further reduces the size and length of a power outage. For short circuits between the substation circuit breaker 24 and the recloser 30, the system 27 of FIG. 3 operates the same as the system 21 of FIG. 1. For short circuits downstream of the recloser 30, the systems operate differently. The short circuit 28 shown in FIG. 3 will cause a large current to flow from the substation 22 through the recloser 30 and to the short circuit 28. The recloser 30 senses the large current and opens quickly. The substation circuit breaker 24 is programmed to open with a longer time delay than the recloser 30, so the recloser opens and the substation breaker remains closed. This removes power from loads Load 3 and Load 4, but power to Load 1 and Load 2 is only degraded while the large current is flowing, and is completely restored when the recloser 30 opens. Typically the recloser will open in less than one second, so the short circuit 28 in FIG. 3 will only cause a power degradation lasting less than one second for Load 1 and for Load 2. The recloser 30 may be programmed to reclose after some time to test if the short circuit 28 is temporary. If the short circuit is temporary, then Load 3 and Load 4 will be without power for only a few seconds.

If the short circuit is permanent, then the recloser 30 will open and close a predetermined number of times, then open one final time and remain opened. Load 3 and Load 4 will remain un-powered for several hours while the line crew searches for and repairs the short circuit. Load 1 and Load 2 will experience a power degradation lasting less than one second each time the recloser 30 closes to test if the short circuit 28 still exists. This is an improvement over the system 23 of FIG. 2 where Load 1 and Load 2 experienced a power outage lasting several seconds.

C. Power Distribution Systems with Looped Distribution Lines

A system 31 in FIG. 4 shows a further improvement over the radial distribution systems of FIGS. 1-3 with looped distribution circuits providing rapid power restoration following permanent short circuits. The previously considered systems 21, 23 and 27 in FIGS. 1-3 involved radial distribution lines. The system 31 of FIG. 4 involves a looped distribution line 32. The term "looped" means that power can be fed to any of the loads, Load 1 through Load 6, from either direction. This system 31 is normally operated in the state shown in FIG. 4. In the normal operational state of the system shown in FIG. 4, reclosers R1, R2, R4 and R5 are closed, and recloser R3 is open. Recloser R3 is normally open because if all of the reclosers were closed, it would be difficult to control the amount of power flowing through the looped line, especially if the two circuit breakers 24 and 25 are in different substations.

Reclosers R1, R2, R4 and R5 can sense current flowing through them, and can also measure or at least sense the presence or absence of voltage on at least one side; typically the side closer to the substation 22 or the power source. Recloser R3 can measure current and can measure voltage on both sides of itself. Methods of measuring current and measuring or sensing voltage are, of course, well known in the art.

Recall that the system 27 shown in FIG. 3 performed very well for the short circuit 28 shown in FIG. 3. Load 1 and Load 2 experienced power degradation lasting less than one second even for a permanent fault. However, if the permanent short circuit 28 were upstream of the recloser 30 in FIG. 3, then all four loads would experience an extended power outage. So, the performance of system 27 depends on the location of the short circuit 28. The system 31 shown in FIG. 4 removes the dependence on short circuit location. This system performs substantially equally well regardless of where the short circuit exists or occurs.

For example, FIG. 5 shows a permanent short circuit 28 upstream of recloser R1. If the system 31 were not looped, then this short circuit would result in an extended power outage for loads Load 1, Load 2, and Load 3, because the substation breaker 24 would open and would de-energize the line serving all of those loads.

FIG. 6 and FIG. 7 show how the system 31 limits the size and duration of the outage for the short circuit 28 shown in FIG. 5. The short circuit 28 causes a large current to flow from the power source inside the substation 22 to the short circuit 28. The substation circuit breaker 24 opens for a pre-determined time, causing a temporary power outage for loads Load 1, Load 2 and Load 3. The substation breaker 24 typically tests the line 32 several times to see if the short circuit 28 is temporary. If the short circuit is temporary, then when the circuit breaker 24 closes the short circuit 28 will no longer exist, and the system 31 will return to the state shown in FIG. 4. If the short circuit 28 is permanent, the substation breaker 24 opens and closes a predetermined number of times, i.e., the breaker tests the line for a temporary short circuit, and then breaker 24 remains open. Reclosers R1 and R2 sense that the line connected to them is de-energized for an extended time. Reclosers R1 and R2 are both programmed to take specific action when they sense that the line 32 is de-energized for an extended time (e.g. longer than some predetermined time).

Recloser R1 is programmed to open following a predetermined time delay after the line becomes de-energized. Recloser R2 is programmed to reconfigure to protect the section of line 32 between reclosers R2 and R1. Recloser R2 was previously configured to protect the section of line between reclosers R2 and R3 because the power source or substation 22 was to the left of recloser R2. Recloser R3 is programmed to close after a predetermined time when it senses that the line 32 connecting to either side of recloser R3 is de-energized. After the substation breaker 24 has finished testing the line for a temporary short circuit and breaker 24 is open, and all of the reclosers perform their programmed tasks, the system 31 is as shown in FIG. 7.

Notice that only Load 1 connected between recloser R1 and the substation breaker 24 experiences a prolonged power outage. Load 2 and Load 3 would have also experienced a prolonged power outage if the system were radial. However since the system 31 is looped, Load 2 and Load 3 are without power only for a few tens of seconds while circuit breaker 24 is open and while the predetermined time delays elapse before recloser R1 opens, recloser R2 reconfigures, and recloser R3 closes. A timeline for the entire process is shown in the bottom portion of FIG. 7.

Now assume a permanent short circuit 28 occurs between reclosers R1 and R2, as shown in FIG. 8. The permanent short circuit causes a large current to flow from the substation power source through the circuit breaker 24 and through recloser R1 to the short circuit 28. Recloser R1 is programmed to open with less delay than the substation breaker 24, so recloser R1 opens and circuit breaker 24 remains closed. I.e., when recloser R1 opens, the short circuit current ceases, so the substation breaker 24 does not open. Recloser R1 closes several times to test the line 32 for a temporary short circuit. In this example, the short circuit 28 is permanent, so recloser R1 eventually opens permanently. It opens before the substation breaker 24 is programmed to open, so the substation breaker remains closed.

The system 31 is now in the state shown in FIG. 9. Load 2 and Load 3 are de-energized. Recloser R2 performs exactly as in the previous example. If it senses that the line connected to it is de-energized for an extended time (e.g. longer than some predetermined time), it reconfigures to protect the section of line 32 between reclosers R1 and R2. Recloser R3 also acts exactly the same as it did in the previous example. It reconfigures to protect the section of line between reclosers R2 and R3, and closes, which brings the system 31 to the state shown in FIG. 10.

The permanent short circuit now causes a large current to flow from the substation, through reclosers R5, R4, R3, and R2, causing a temporary power degradation to Load 2, Load 3, Load 4, Load 5, and Load 6. When recloser R2 senses a large current after reconfiguring to protect the line between reclosers R2 and R1, it opens very rapidly, and remains open. It does not attempt to reclose. Because recloser R2 opens very rapidly, reclosers R3, R4 and R5 and circuit breaker 25 all remain closed.

The system 31 now resides in the state shown in FIG. 11. Notice that the permanent short circuit 28 between reclosers R1 and R2 only caused an extended power outage for the Load 2 connected between reclosers R1 and R2. Load 1 experienced one to several temporary power degradations as recloser R1 was testing the line for a temporary short circuit. Load 3 experienced one to several temporary power outages lasting several seconds as recloser R1 was testing for a temporary short circuit, and then experienced a longer power outage as reclosers R2 and R3 reconfigured. Finally Load 3 experienced a temporary power degradation when recloser R3 closed, causing short circuit current to flow through reclosers R2, R3, R4 and R5. Load 4, Load 5 and Load 6 all experienced a temporary power degradation lasting less than one second when recloser R3 closed. If the substation breakers 24 and 25 are located in the same substation 22, or in substations electrically close to each other, then Load 4, Load 5 and Load 6 may also experience temporary degradations in power due to the initial short circuit, and when recloser R1 tests the line for a temporary short circuit. A timeline for the entire process is shown in the bottom portion of FIG. 11.

In our final example of this configuration, assume a permanent fault 28 between reclosers R2 and R3, as shown in FIG. 12. This short circuit causes large short circuit current to flow through the substation breaker 24 and reclosers R1 and R2. Recloser R2 is programmed to open with less delay than the substation breaker 24 and recloser R1, so recloser R2 opens. The short circuit current ceases, so the substation breaker 24 and recloser R1 remain closed. Recloser R2 tests the line 32 several times for a temporary short circuit, and finally opens permanently. Each time recloser R2 opens, it does so before recloser R1 and the substation breaker 24 react, so each time recloser R1 and the substation breaker 24 remain closed.

The system 31 is now in the state shown in FIG. 13. As with the previous examples, recloser R3 is programmed to close after it senses either line connected to it is de-energized. When recloser R3 closes, a large short circuit current flows through reclosers R3, R4 and R5 and circuit breaker 25. Recloser R3 is programmed to open and not reclose in response to short circuit current. After recloser R3 opens, the system reverts to the state shown in FIG. 13. Notice that Load 1 and Load 2 only experienced one to several temporary power degradations while recloser R2 tested the line for a permanent fault. Load 4, Load 5 and Load 6 experienced one temporary power degradation when recloser R3 closed. Load 3 is the only load that experiences an extended power outage. A timeline for the entire process is shown in the bottom portion of FIG. 13.

All three of the previous examples could have included short circuits on the lower half of the distribution loop, and the results would have been similar except that breaker 25, reclosers R3, R4, and R5, and loads Load 4, Load 5, and Load 6 would have been involved.

Each of the reclosers in looped distribution lines has a set of rules for operation. From the preceding discussion, it might seem that each recloser performs different functions depending on the location of the short circuit. However, each recloser follows a certain preprogrammed sequence of actions regardless of the location of the short circuit. FIG. 14 shows a flow chart of the preprogrammed sequence of actions that are taken by recloser R3, FIG. 15 shows a flow chart of the preprogrammed sequence of actions that are taken by reclosers R2 and R4 and FIG. 16 shows a flow chart of the preprogrammed sequence of actions that are taken by reclosers R1 and R5.

Each flowchart, FIGS. 14 through 19, has a start and end bubble. The methods move from the end bubble or from anywhere in the flowchart to the start bubble when the scheme is reset or restarted. The reset or restart occurs after the permanent short circuit is repaired or when an operator determines the method should be reset. The reset or restart can be manual, such as when a person issues a reset signal or command to the recloser, or automatic, such as when the reclosers reset themselves when they detect some sufficient condition.

The above-described operation of recloser R3 is summarized in FIG. 14. After starting at bubble 40, recloser R3 determines if line 32 is de-energized for a predetermined time on one side only at decision block 41. If the line is energized on both sides of recloser R3, or de-energized on both sides of recloser R3, it continues to measure voltage on both side of recloser R3 until line 32 is de-energized on one side only for some predetermined time. If the line is de-energized on one side only for a predetermined time, the process proceeds to decision block 42 to determine if line 32 is de-energized to the right of recloser R3. If so, recloser R3 configures to protect line 32 to the right of recloser R3 at block 43. If not, recloser R3 configures to protect line 32 to the left of recloser R3 at block 44. In either situation, recloser R3 closes at block 45. It then continues to sense for short circuit current at decision block 46. If recloser R3 detects a short circuit current lasting longer than a predetermined time, recloser R3 opens at block 47 and the process terminates at end bubble 48.

The above-described operation of reclosers R2 and R4 is summarized in FIG. 15. After starting at bubble 50, reclosers R2 and R4 determine if a short circuit current is present on line 32 at decision block 51. If a short circuit is present, reclosers R2 and R4 determine at decision block 52 if the short circuit current lasts longer than a first predetermined time. If not, the process begins again at start bubble 50. If the short circuit current lasts longer than a predetermined time, then recloser R2 or R4 opens at block 58. Decision block 59 determines if the line has been tested for temporary short circuits more than a predetermined number of times. If it has, then the process ends at block 57. If the line has been tested for a temporary short circuit less than a predetermined number of times, then the recloser R2 or R4 is closed at block 60 and the process continues from the start bubble. If no short circuit current is detected at decision block 51, then a check is performed to determine if the line is energized at decision block 53. If the line is not de-energized, i.e., if the line is still energized, then the process continues from the start bubble. If the line is de-energized, then recloser R2 or R4 is reconfigured to protect the upstream line, i.e., recloser R2 or R4 is reconfigured to protect the line between reclosers R1 and R2 or between reclosers R5 and R4. Reclosers R2 and R4 again monitor line 32 for a short circuit current that lasts longer than a predetermined amount of time at block 55. If a short circuit current is detected and lasts longer than the predetermined amount of time, recloser R2 and/or recloser R4 open at block 56 and end the process at bubble 57.

The above-described operation of reclosers R1 and R5 is summarized in FIG. 16. After starting at bubble 61, reclosers R1 and R5 determine if a short circuit current is present on line 32 at decision block 62. If a short circuit is present, reclosers R1 and R5 determine at decision block 63 if the short current lasts longer than a first predetermined time. If the short circuit current does not last longer than a predetermined time, then the process reverts to the start bubble 61. If the short circuit lasts longer than a predetermined time, then recloser R1 or R5 opens at block 67. Decision block 68 determines if the line has been tested for temporary short circuits more than a predetermined number of times. If it has, then the process ends at bubble 66. If the line has been tested for a temporary short circuit less than a predetermined number of times, then recloser R1 or R5 is closed at block 69 and the process continues from the start bubble. If short circuit current is not detected at decision block 62, then recloser R1 or R5 determine if the line has been de-energized for longer than a predetermined time at decision block 64. If the line has not been de-energized for longer than a predetermined time, then the process reverts to start bubble 61. If the line has been de-energized for a predetermined time, then recloser R1 or R5 opens at block 65, and the process ends at bubble 66.

These processes in FIGS. 14-16 are sufficient to reduce the extended power outage to only the section of looped distribution line 32 containing the permanent short circuit 28. Notice that these processes cover only the function of the reclosers related to controlling the looped distribution line 32. Each recloser may perform various other functions, such as metering, reporting, etc. These other functions are not shown in FIGS. 14, 15 and 16.

A number of problems exist with respect to the present method of controlling looped distribution lines, as represented by FIGS. 14-16. The method implemented by the processes discussed above has several non-idealities:

A. Permanent short circuits 28 between reclosers R1 and R2, or between reclosers R2 and R3 cause a temporary power degradation to Load 4, Load 5 and Load 6 when recloser R3 closes. If the system were not configured as a loop, i.e. if recloser R3 did not connect the top distribution line to the bottom distribution line, then this temporary power degradation would not occur (assuming the looped distribution line terminated in electrically separated substations), or this temporary power degradation would be less severe. In other words, this arrangement decreases the quality of power supplied to the distribution line that does not have the short circuit 28 while it increases the quality of power supplied to the distribution line that does have a short circuit.

B. Permanent short circuits 28 between reclosers R1 and R2, or between reclosers R2 and R3, cause added stress on the power system when recloser R3 closes. This stress includes large short circuit currents that stress transformers, generators, conductors, etc. The added stress also includes decreased voltages that stress many types of connected electrical loads such as motors and electronics. The added stress also includes added wear on recloser R3 when recloser R3 must open after closing with a permanent fault between reclosers R2 and R3, and added wear on recloser R2 when R2 must open after recloser R3 closes with a permanent fault between reclosers R1 and R2.

C. If the power source in the substation is de-energized, then the distribution line is de-energized. Recloser R1 responds to this by opening (Blocks 64 and 65 in FIG. 16). This is a nuisance because after power is restored to the substation, the loads downstream of recloser R1 remain de-energized until recloser R1 is closed, possibly by a manual operation after several hours.

The shortcomings described are also applicable to the other side of the loop in FIGS. 14-16, i.e., the side of the loop containing breaker 25 and reclosers R4 and R5.

There has been a long-felt need for methods or systems that efficiently and effectively reconfigure an electrical power distribution system to provide power to most of the loads upon the occurrence of a short circuit on the distribution line.

Accordingly, it is a general object of the present invention to provide improved methods and systems that reconfigure a looped distribution line in a manner that continues to supply power to most of the loads when a short circuit occurs.

Another general object of the present invention is to provide improved methods and systems for sectionalizing a looped distribution line to reduce the stress on the power system and on the power system components when a short circuit occurs.

Another general object of the present invention is to provide improved methods and systems for sectionalizing a looped distribution line to reduce the unnecessary outages in the distribution power system when no short circuit exists in the distribution power system.

Yet another object of the present invention is to provide a plurality of preprogrammed switches, with at least some of the preprogrammed switches having at least one unique open interval when responding to a short circuit, such that other preprogrammed switches can determine which preprogrammed switch opened in response to the short circuit.

A further object of the present invention is to provide a power distribution system and methods in which a normally open preprogrammed switch does not close until an adjacent preprogrammed switch opens when the short circuit is downstream from the adjacent preprogrammed switch.

A still further object of the present invention is to provide methods for determining which preprogrammed switch opened in response to the occurrence of a short circuit.

BRIEF SUMMARY OF THE INVENTION

This invention is directed to methods and systems for sectionalizing a looped distribution line, such as from a substation in an electric power distribution system, that supplies electrical power to a plurality of loads and that also reduces the stress on the power system and on the power system components when a short circuit occurs and that also reduces unnecessary temporary outages. The electric power distribution system includes a plurality of preprogrammed switches disposed between at least some of the plurality of loads. The plurality of preprogrammed switches includes a first preprogrammed switch and a fifth preprogrammed switch each disposed in the looped distribution line downstream from said substation, a second preprogrammed switch and a fourth preprogrammed switch each disposed in the looped distribution line downstream from said first and fifth preprogrammed switches and a third preprogrammed switch disposed in the looped distribution line between said second and fourth preprogrammed switches. The third preprogrammed switch is in a normally open condition. All of said preprogrammed switches are programmed to respond to the occurrence of a short circuit in the looped distribution line and to reconfigure the looped distribution line to isolate the short circuit.

Methods of the present invention include the steps of providing some of the plurality of preprogrammed switches with a unique open interval time for at least one of its open intervals when responding to a short circuit condition on the looped distribution line, determining the length of the unique open interval by at least one of the preprogrammed switches in response to the occurrence of a short circuit, identifying that the short circuit is in a portion of the looped distribution line that is downstream from the preprogrammed switch associated with the determined unique open time interval, and configuring the preprogrammed switch downstream to protect the identified portion of the looped distribution line.

The step of configuring the next downstream preprogrammed switch may include the steps of immediately opening the second preprogrammed switch upon determining that the short circuit is between the first and second preprogrammed switches, configuring the third preprogrammed switch to protect the line between the second and third preprogrammed switches and closing the third preprogrammed switch. The step of configuring the next downstream preprogrammed switch may also include the steps of immediately opening the fourth preprogrammed switch upon determining that the short circuit is between the fifth and fourth preprogrammed switches, configuring the third preprogrammed switch to protect the line between the fourth and third preprogrammed switches and closing the third preprogrammed switch.

The step of providing each preprogrammed switch with a unique open time interval may include the steps of providing the preprogrammed switches in the substation with a unique open time interval of time t1, providing the first and fifth preprogrammed switches with a unique open time interval of time t2, with t2 greater than t1, and providing the second and fourth preprogrammed switches with a unique open time interval of time t3, with t3 greater than t2. The step of determining at each preprogrammed switch the length of said open time interval may include the additional steps of determining if the open interval used to test the line for a temporary short circuit is greater than time t1 but less than time t2 and determining if the open interval used to test the line for a temporary short circuit is greater than time t2 but less than time t3.

Systems in accordance with the present invention may include a plurality of preprogrammed switches disposed between at least some of the plurality of loads, one of the preprogrammed switches being in a normally open condition, some of said plurality of preprogrammed switches programmed to respond to the occurrence of a short circuit in the looped distribution line and to reconfigure the looped distribution line to isolate the short circuit, some of said plurality of preprogrammed switches provided with a unique open time interval for at least one of its open intervals when responding to a short circuit condition on the looped distribution line and at least one of said plurality of preprogrammed switches capable of determining the length of said unique open time interval in response to the occurrence of a short circuit to identify that the short circuit is in a portion of the looped distribution line that is downstream from the preprogrammed switch associated with the determined unique open time interval; whereby the next downstream preprogrammed switch is configured to protect the identified portion of the looped distribution line that is downstream from the preprogrammed switch with the determined unique open interval. The normally open switch may typically determine the amount of time of the unique open time interval.

Systems may further include a preprogrammed switch disposed adjacently to said normally open preprogrammed switch that immediately opens upon determining that the short circuit is between the adjacent, the normally open preprogrammed switches and the normally open preprogrammed switch configures to protect the line between the adjacent and the normally open preprogrammed switches and the normally open switch closes after the adjacent switch has opened. Systems may further include a first pair of preprogrammed switches disposed at each end of the looped distribution line in the substation, said first pair of preprogrammed switches provided with a unique open time interval of time t1, a second pair of preprogrammed switches disposed next downstream in the looped distribution system from the first pair of preprogrammed switches in the substation, said second pair of preprogrammed switches provided with a unique open time interval of time t2, with t2 greater than t1 and a third pair of preprogrammed switches disposed next downstream in the looped distribution system from the second pair of preprogrammed switches, said third pair of preprogrammed switches provided with a unique open time interval of time t3, with t3 greater than t2. At least one of the preprogrammed switches may determine if the open interval used to test the line for a temporary short circuit is greater than time t1 but less than time t2 and/or determine if the open interval used to test the line for a temporary short circuit is greater than time t2 but less than time t3.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the figures in which like reference numerals identify like elements, and in which:

DESCRIPTION OF THE PREFERRED EMBODIMENTS

The shortcomings of prior art looped distribution systems described above in Paragraphs 0035-0036 can be overcome by facilitating the reclosers to communicate with each other. For example, for a permanent short circuit 28 between reclosers R1 and R2, after recloser R1 opens permanently, recloser R1 could send a signal to recloser R2 telling recloser R2 to also open. Then, when recloser R3 closes, there would be no large short circuit current which would stress the system as described above, and there would be no temporary power degradation for Load 3, Load 4, Load 5 and Load 6. Similar benefits are possible for other short circuit locations when the reclosers communicate with each other. In another example, if the power source inside the substation is de-energized, then the protective relay associated with circuit breaker 24 could send a signal to recloser R1 not to open. Then, when the power source inside the power station is reenergized, recloser R1 would still be closed and the downstream loads would be reenergized immediately without manual intervention.

However, communications infrastructure is rarely available to allow reclosers to communicate with each other in a typical looped distribution line 32. What is needed is a way to prevent the shortcomings described in A:, B: and C: above, without requiring dedicated or traditional communications between the reclosers.

Figure 1:
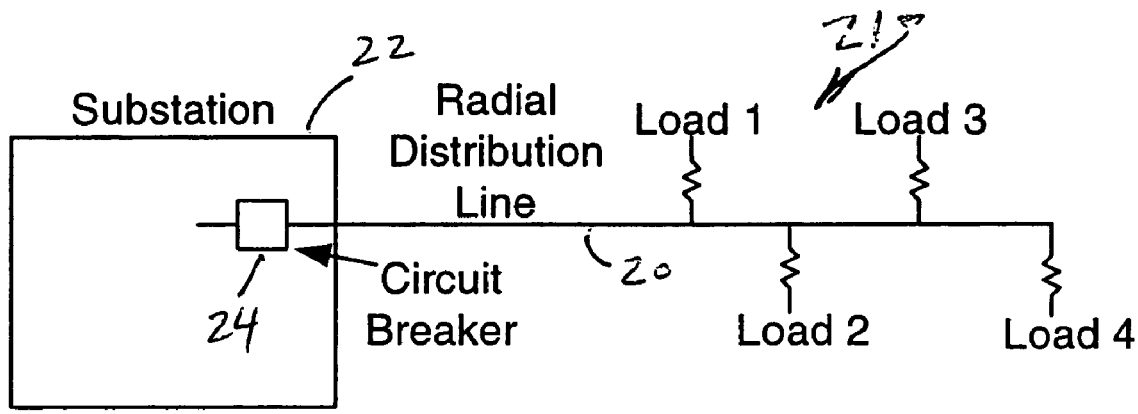
FIG. 1 illustrates a single radial distribution line feeding several loads from a distribution substation.
Figure 2:
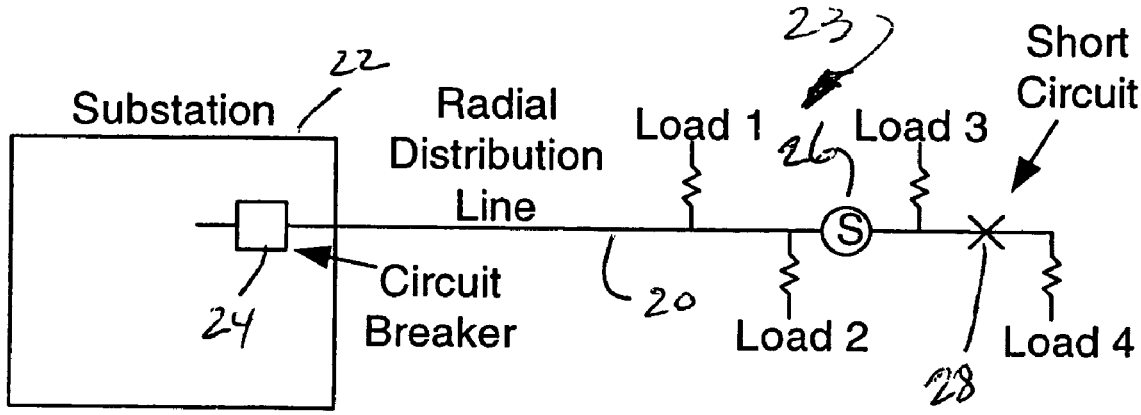
FIG. 2 illustrates a sectionalizer switch interposed between some of the loads in the radial distribution line of FIG. 1.
Figure 3:
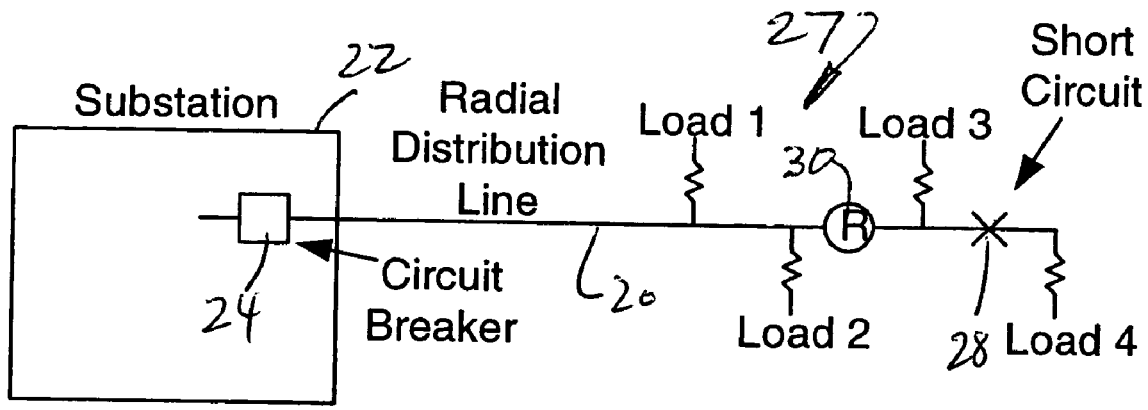
FIG. 3 illustrates a recloser interposed between some of the loads in the radial distribution line in place of the sectionalizer switch of FIG. 2.

Note that while a sectionalizer switch 26 is used in FIG. 2, reclosers R1-R5 are used in FIGS. 4-13 and circuit breakers 24-25 are used at the substation 22 in FIGS. 1-13, that these devices, including their respective controllers, may be more generally characterized as preprogrammed switches. Of interest with respect to the present invention is that these preprogrammed switches are programmed or set to have at least one open interval in response to a short circuit that is of a known length or duration. Preferably, the preprogrammed switches in the upper segment of the looped distribution line (such as circuit breaker 24 and reclosers R1 and R2 in FIGS. 4-13), each have a unique open interval of different times such that the other preprogrammed switches in that segment and the normally open recloser R3 can determine which preprogrammed switch opened in response to the presence of a short circuit on the looped distribution line 32.

Figure 4:
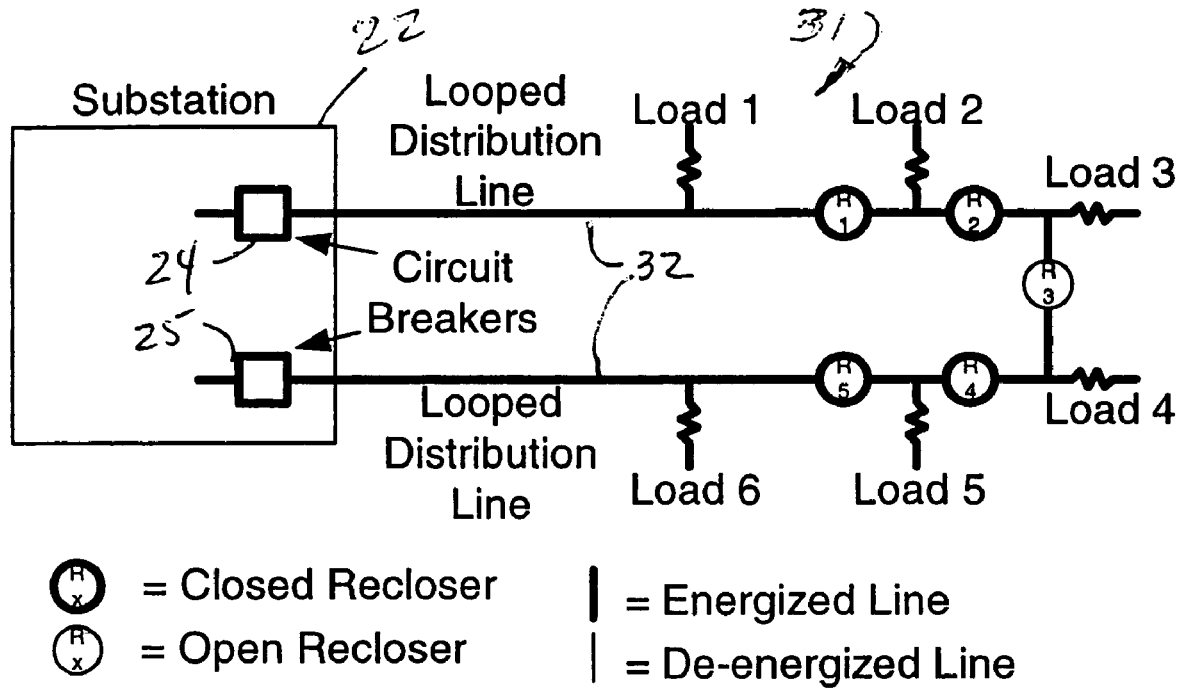
FIG. 4 illustrates a plurality of reclosers, with each recloser interposed between respective loads in a looped distribution system.
Figure 5:
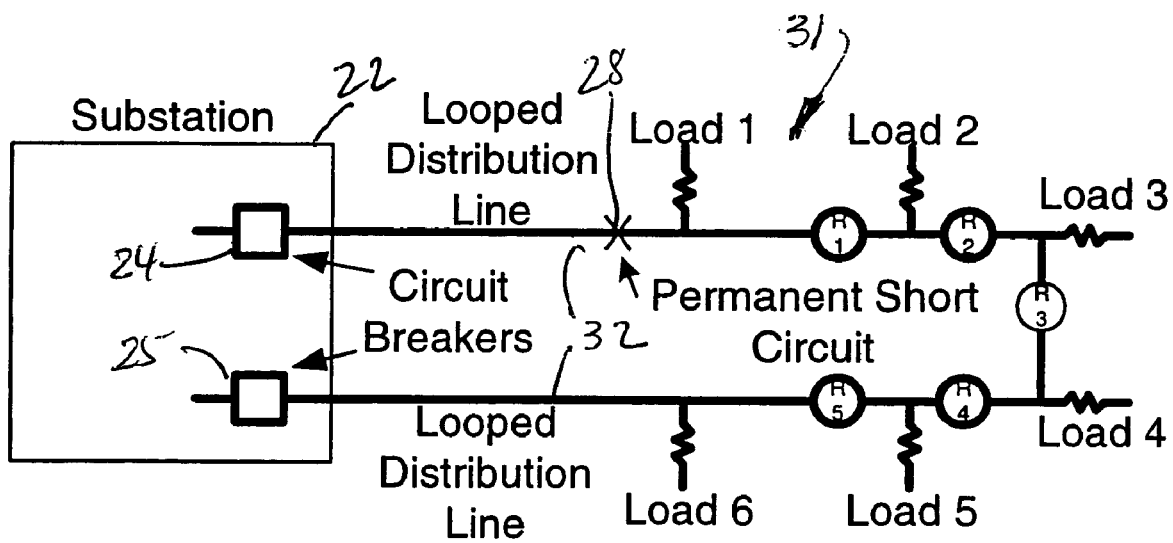
FIG. 5 illustrates a short circuit in the looped distribution line of FIG. 4.
Figure 6:
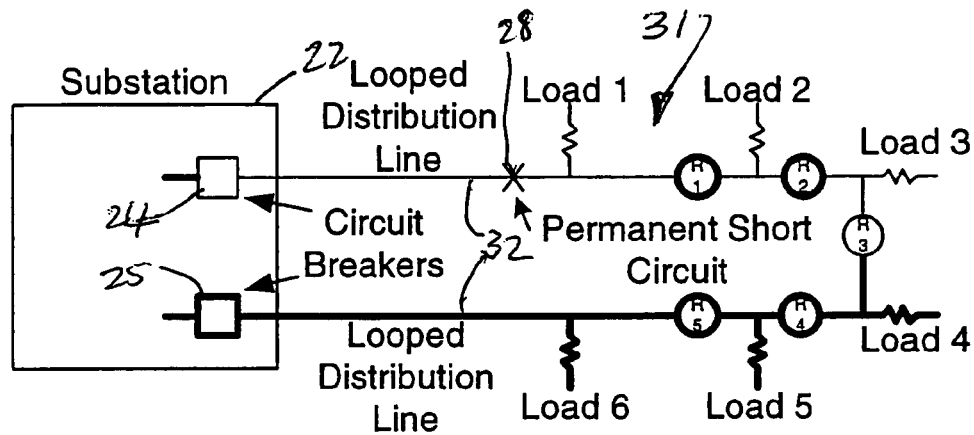
FIGS. 6 and 7 illustrate the response of the plurality of reclosers to reconfigure the distribution system in response to sensing conditions on the looped distribution line caused by the short circuit in FIG. 5.
Figure 7:
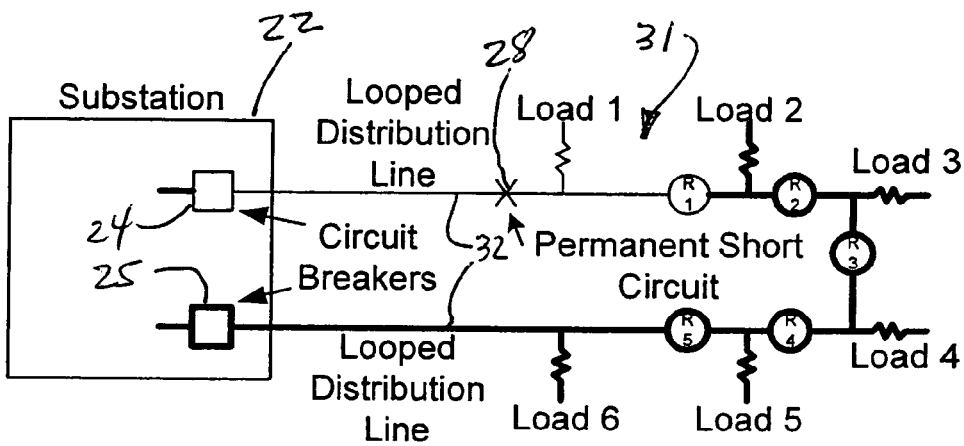
Figure 7:
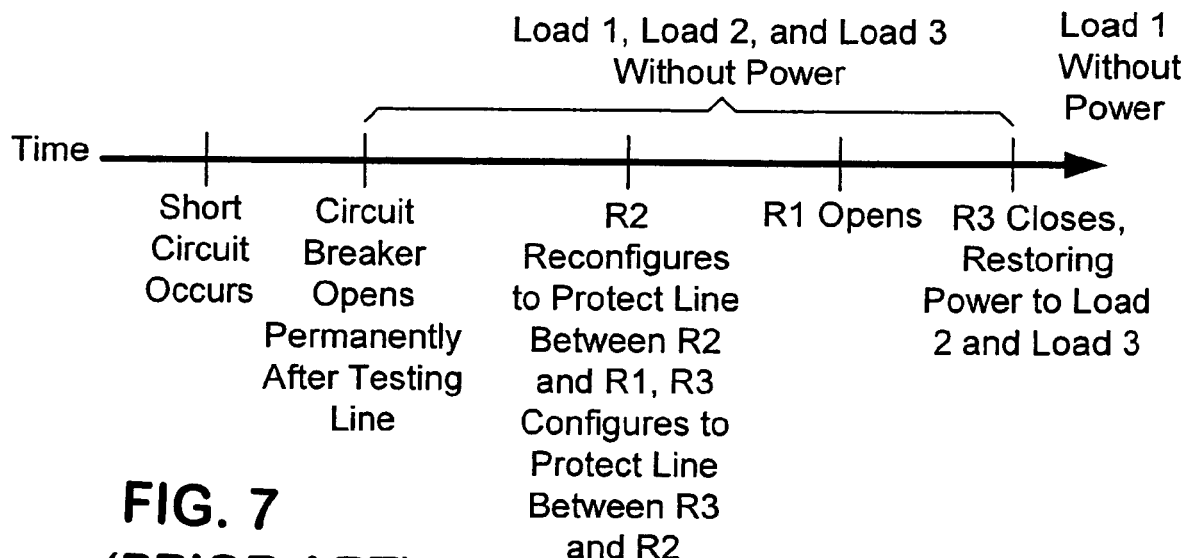
Figure 8:
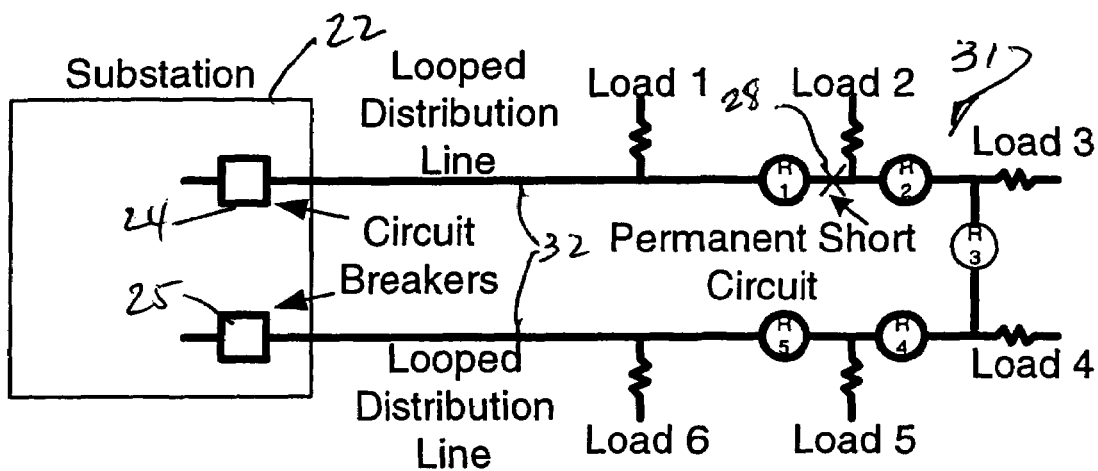
FIG. 8 illustrates a short circuit at a different location in the looped distribution line from that shown in FIG. 5.
Figure 9:
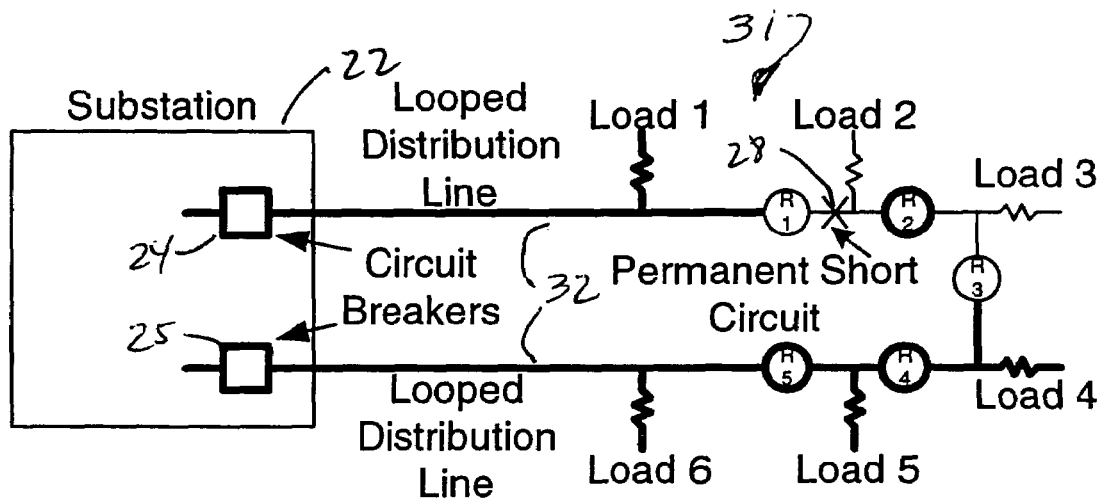
FIGS. 9 through 11 illustrate the response of the plurality of reclosers to reconfigure the distribution system in response to sensing conditions on the looped distribution line caused by the short circuit in FIG. 8.
Figure 10:
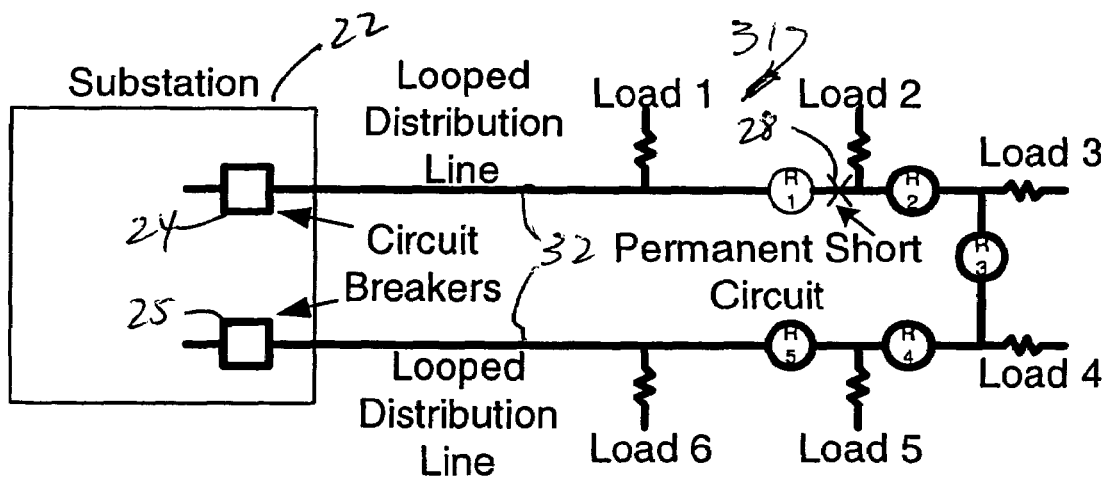
Figure 11:
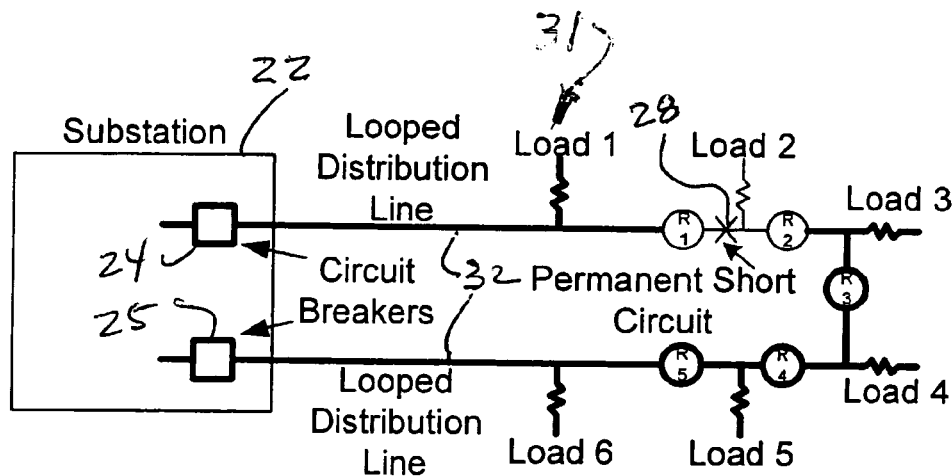
Figure 11:
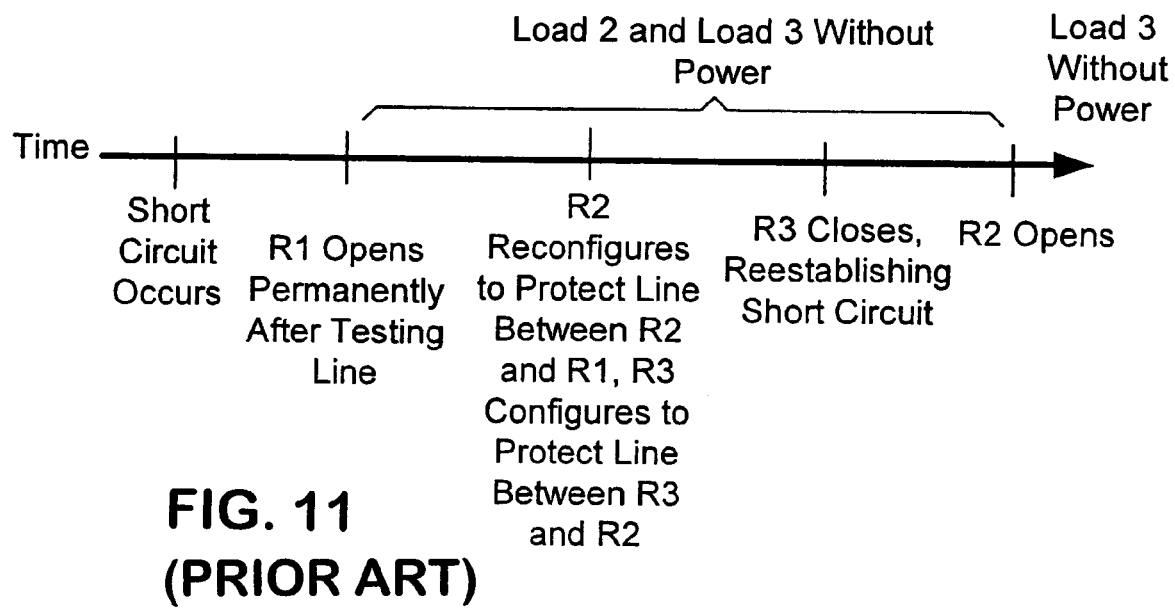
Figure 12:
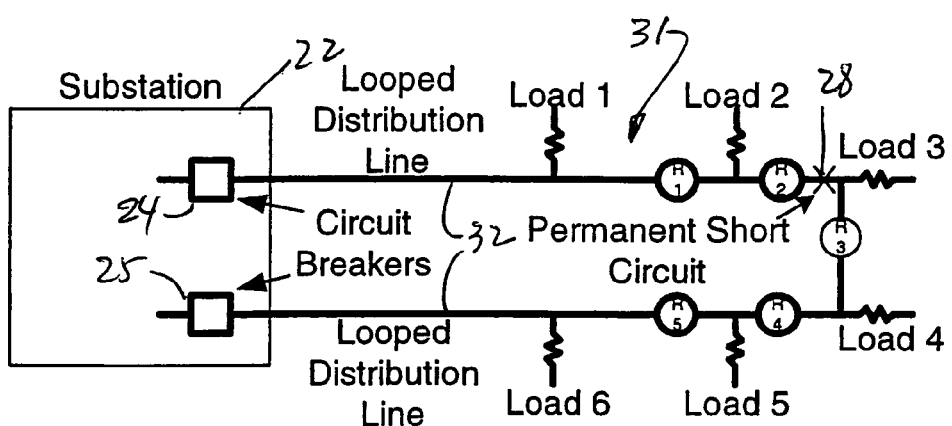
FIG. 12 illustrates a short circuit at a still different location in the looped distribution line from that shown in FIG. 5 or 8.
Figure 13:
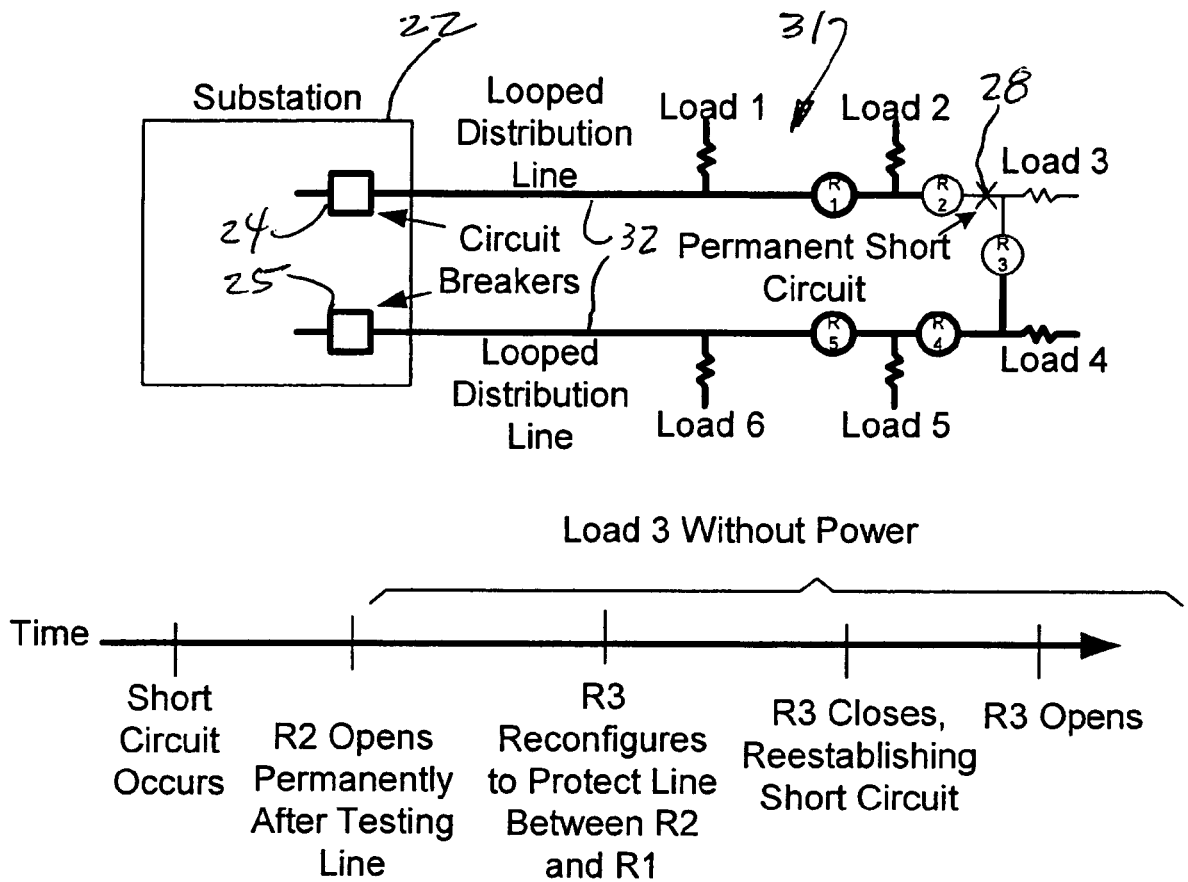
FIG. 13 illustrates the response of the plurality of reclosers to reconfigure the distribution system in response to sensing conditions on the looped distribution line caused by the short circuit in FIG. 12.

In accordance with one aspect of the present invention, the methods described herein prevent added stress to the power system and to the power system components when recloser R3 closes in a looped distribution system 31 similar to that shown in FIG. 4. To prevent the problematic short circuit current from flowing when recloser R3 closes, it is necessary to:

1: Open recloser R2 before recloser R3 closes when a permanent short circuit exists between reclosers R1 and R2.

2: Prevent recloser R3 from closing when a permanent short circuit exists between reclosers R2 and R3. Again, similar discussions and results exist for the other half of the looped distribution line.

Notice that in both required actions above, both reclosers R2 and R3 apparently need to know the location of the short circuit. The present invention allows recloser R2 and R3 to operate as required in 1: and 2: above without requiring detailed knowledge of the short circuit location and without the need for communications circuits between the reclosers. The reclosers still operate from a fixed set of processes, but the processes are different than for the system previously described.

In accordance with another aspect of the present invention, the methods described herein prevent unnecessary extended outages when the power source inside the substation de-energizes. Such an outage is caused when recloser R1 or R5 opens during the source de-energization. When recloser R1 or R5 opens during such a source de-energization, manual intervention may be necessary to close recloser R1 or R5 after the source is reenergized. To prevent such an extended outage, it is required to prevent recloser R1 or R5 from opening during source de-energizations.

Figure 17:
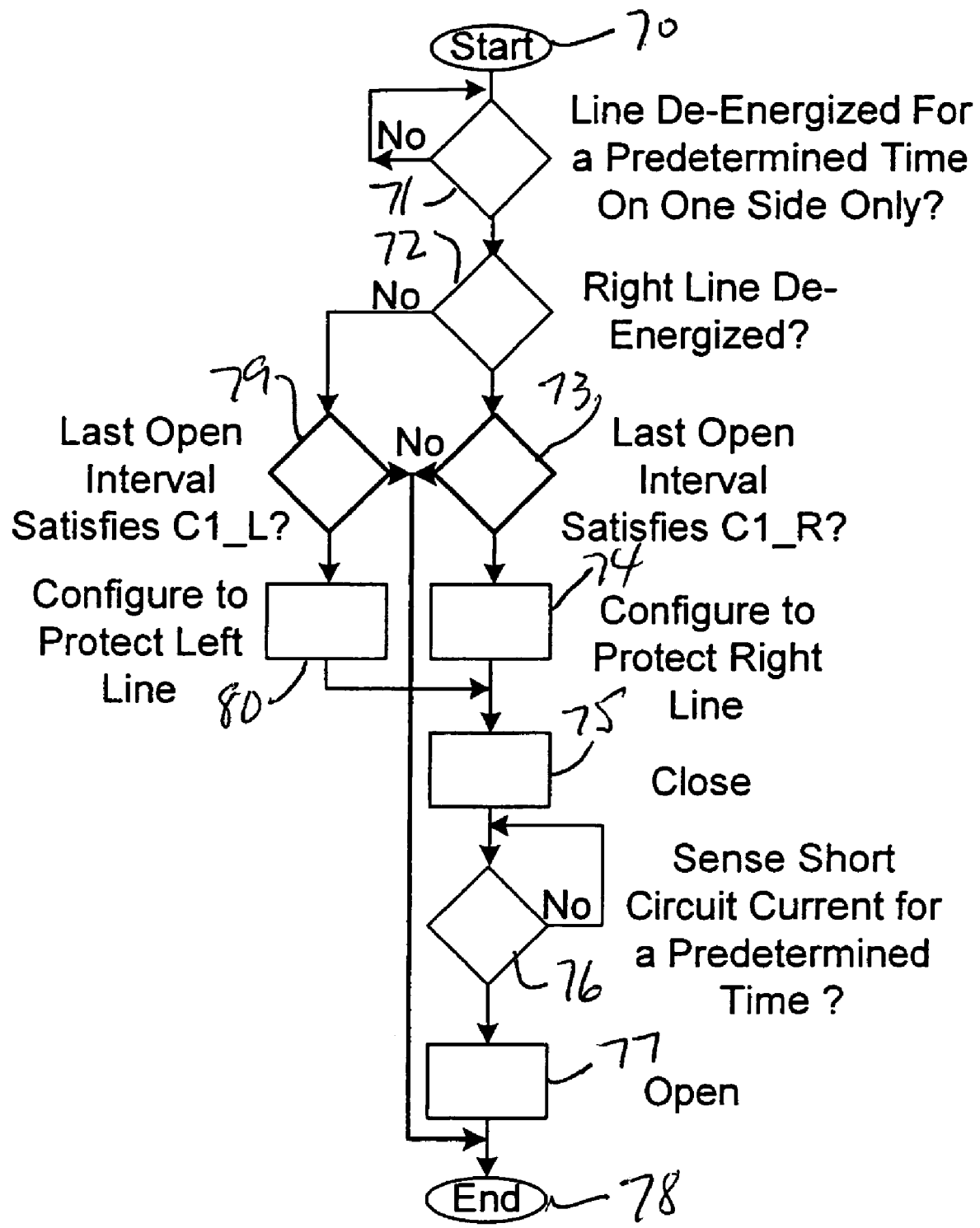
FIG. 17 is a flow chart of a preprogrammed sequence of actions that are taken by a recloser in a looped distribution system in accordance with the present invention.

FIG. 17 shows the rules of operation for recloser R3. The flow charts refer to conditions C1_L, C1_R, C2 and C3. These names have no significant meanings, and the conditions are defined later. Bold lines in FIG. 17 indicate changes to the prior art, and non-bold lines are the prior art.

Figure 18:
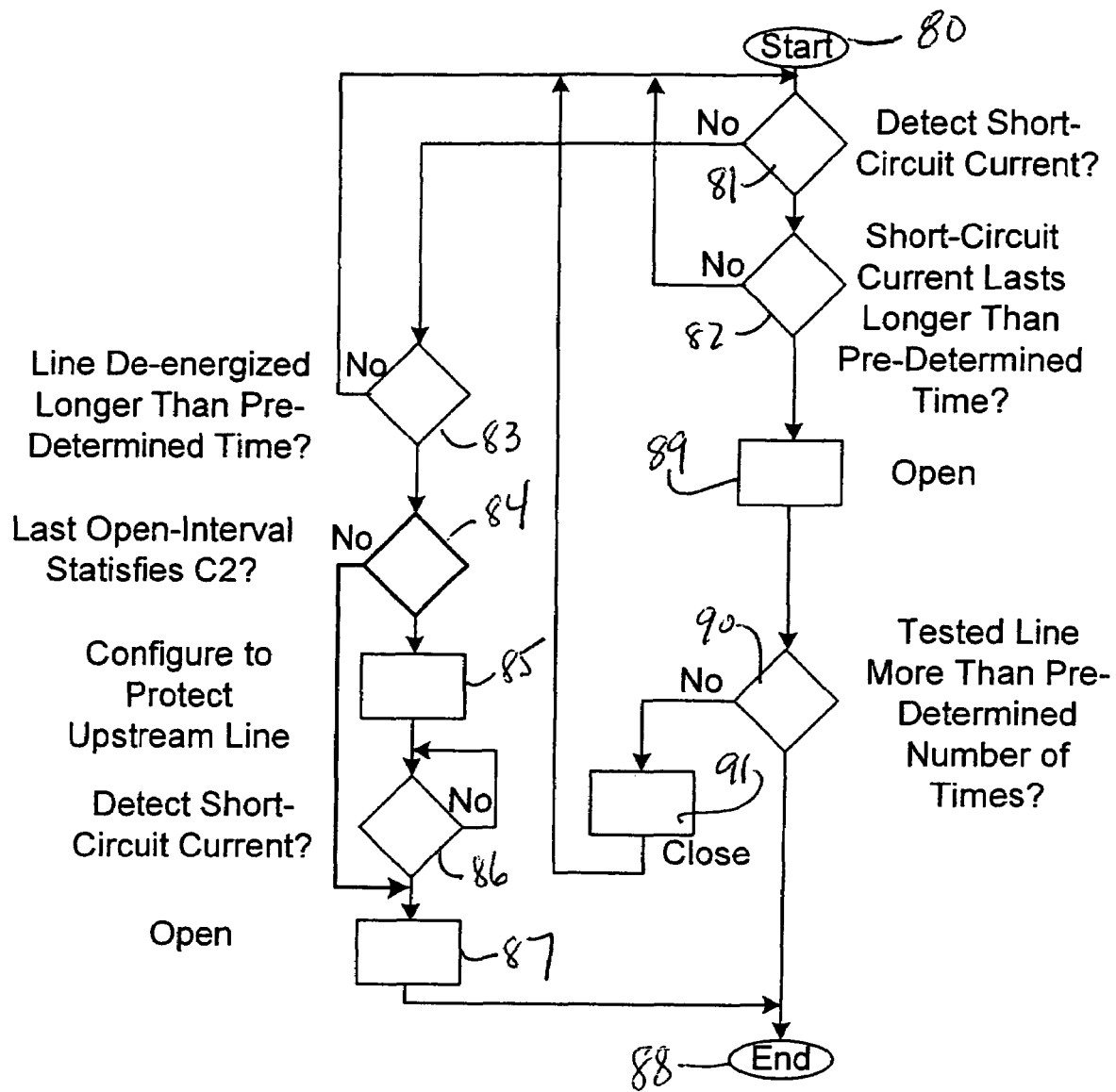
FIG. 18 is a flow chart of a preprogrammed sequence of actions that are taken by certain other reclosers in a looped distribution system also in accordance with the present invention.

FIG. 18 shows a flow chart that includes the rules of operation for reclosers R2 and R4. Again, the bold lines are changes to the prior art, and non-bold lines are the prior art.

Figure 19:
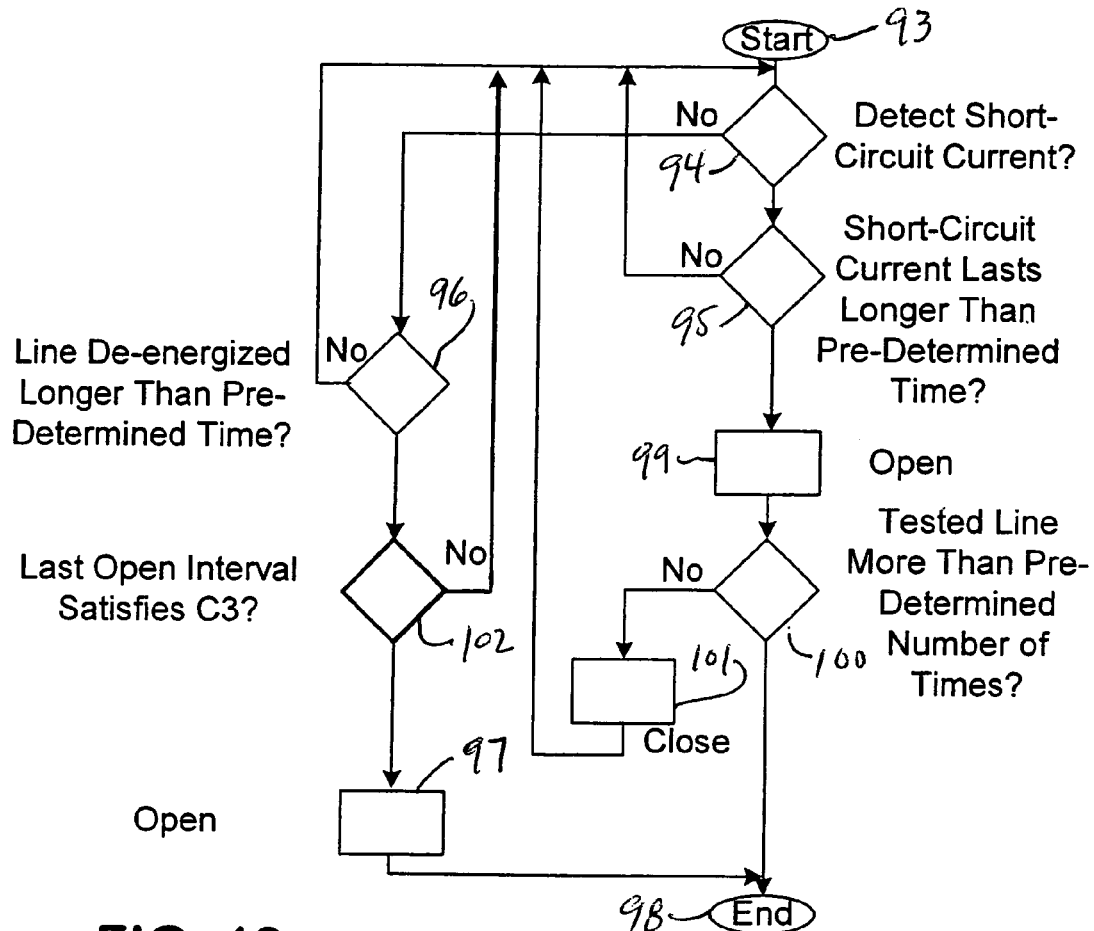
FIG. 19 is a flow chart of a preprogrammed sequence of actions that are taken by still certain other reclosers in a looped distribution system also in accordance with the present invention.

FIG. 19 shows a flow chart that includes the rules of operation for reclosers R1 and R5. Again, the bold lines are changes to the prior art, and non-bold lines are the prior art.

Suitable selections for conditions C1_L, C1_R, C2 and C3 are now presented. Conditions C1_L, C1_R, C2 and C3 are checks against the duration of the final open interval (or possibly some other open interval, or some combination of open intervals) of some other recloser or circuit breaker as sensed by the recloser performing the condition checks. An open interval is the time when a recloser or circuit breaker is open between the closings that test the line for a temporary short circuit. One of the aspects of the present invention is to detect which recloser or substation breaker is opening and closing by setting each device with a unique open interval duration for at least one of the open intervals. All other reclosers on the same circuit can then measure the open interval and know which recloser or substation breaker is operating. By knowing which device is operating, the recloser sensing the duration of the open interval can know between which two devices the short circuit exists.

In the examples which follow, we concentrate on the final open interval before a recloser or substation breaker finally opens and remains open due to a permanent short circuit. Other modifications to the present invention could be to choose some other open interval, such as the first, second, shortest, longest, etc.

As an example of the selections, assume that the substation breaker has a final open interval of about 30 seconds, recloser R1 has a final open interval of about 45 seconds, and recloser R2 has a final open interval of about 60 seconds. Condition C2 could be chosen as "shorter than about 35 seconds". In other words, in FIG. 4 when recloser R2 detects a final open interval shorter than about 35 seconds, it "knows" that the substation breaker was performing the line tests, because the substation breaker has a final open interval of about 30 seconds. Recloser R2 "knows" that it must not have been recloser R1 performing the line tests because recloser R1 has a final open interval of about 45 seconds. Since the substation breaker was performing the line tests, and recloser R1 was not performing the line tests, the short circuit must lie between recloser R1 and the substation breaker. In that case, per FIG. 18, recloser R2 would configure to protect the line between reclosers R1 and R2 in preparation for recloser R3 closing and recloser R1 opening.

If on the other hand, recloser R2 sensed a last open interval longer than about 35 seconds, then it "knows" recloser R1 was testing the line because it has a final open interval of about 45 seconds. Recloser R2 then "knows" that the short circuit lies between reclosers R1 and R2. Per FIG. 18, recloser R2 opens to prevent stressing the rest of the system with a large short circuit current when recloser R3 closes.

A suitable selection for condition C1_R is "shorter than about 50 seconds". In other words when recloser R3 in FIG. 4 detects a final open interval shorter than about 50 seconds, it "knows" that recloser R2 was not testing the line for a temporary short circuit, because recloser R2 has an open interval of about 60 seconds. Since recloser R2 was not testing the line, the permanent short circuit does not lie between recloser R3 and R2, and it is safe for recloser R3 to close. Accordingly, as shown in FIG. 17, recloser R3 will configure to protect the "right" line, or the line between reclosers R3 and R2, and will close.

On the other hand, if recloser R3 detects an open interval longer than about 50 seconds, it "knows" that recloser R2 was testing the line, and the permanent short circuit lies between reclosers R3 and R2. Accordingly, as shown in FIG. 17, recloser R3 would not reconfigure to protect either right or left line, and more importantly recloser R3 would not close. This prevents stress to the system, because if recloser R3 closes, a large short circuit will flow from the substation through reclosers R4, R5 and R3 to the short circuit between reclosers R3 and R2.

Note that condition C1_L could be the same as or different than condition C1_R depending on the open intervals selected for reclosers R4 and R5 and the substation breaker attached to recloser R5.

A suitable selection for condition C3 in FIG. 19 might be "longer than 25 seconds". In other words, when recloser R1 detects an open interval longer than 25 seconds, it knows that the substation breaker was testing the line for temporary short circuits because the substation breaker has a final open interval of 30 seconds. If the line is de-energized and there are either no attempts to test the line for short circuits, or the last open interval does not match the required last open interval of the breaker, then the power source within the substation must have been de-energized. Accordingly, recloser R1 will not open, so that when the power source inside the substation is reenergized, the loads downstream of recloser R1 will be reenergized immediately without delay or need for manual intervention.

The above representative time durations are for illustrative purposes only. Actual times could be significantly longer or shorter. The conditions C1_R, C1_L, C2 and C3 used herein are only one possible set of conditions that create the desired result. Other condition sets are possible.

The operation of recloser R3 in accordance with the present invention is summarized in FIG. 17. After starting at bubble 70, recloser R3 determines if line 32 is de-energized on only one side of recloser R3 at decision block 71. If the line is energized on both sides, or de-energized on both sides, recloser R3 continues to check the voltage on line 32 until line 32 is de-energized on either side of recloser R3, but not on both sides of recloser R3. When recloser R3 detects that the line is de-energized on exactly one side of recloser R3, the process proceeds to decision block 72 to determine if line 32 is de-energized to the right of recloser R3. If so, recloser R3 determines if the last open interval satisfied the condition C1_R at block 73. If not, the process ends at end bubble 78. However, if the condition C1_R is satisfied at block 73, recloser R3 configures to protect line 32 to the right at block 74. Recloser R3 then closes, as indicated at block 75. It then continues to sense for short circuit current at decision block 76. If a short circuit current is detected, recloser R3 opens at block 77 and the process terminates at end bubble 78.

Returning to decision block 72 in FIG. 17, if recloser R3 determines that the line to the right is not de-energized, recloser R3 determines if the last open interval satisfied the condition C1_L at block 79. If not, the process ends at end bubble 78. However, if the condition C1_L is satisfied at block 79, recloser R3 configures to protect line 32 to the left at block 80. The process then continues to block 75 where recloser R3 closes. It then continues to sense for short circuit current at decision block 76. If a short circuit current is detected, recloser R3 opens at block 77 and the process terminates at end bubble 78.

The operation of reclosers R2 and R4 in accordance with the present invention is summarized in FIG. 18. After starting at bubble 80, reclosers R2 and R4 determine if a short circuit current is present on line 32 at decision block 81. If a short circuit is present, reclosers R2 and R4 determine at decision block 82 if the short circuit current lasts longer than a first predetermined time. If not, the process begins again at start bubble 80. If the short circuit current lasts longer than a predetermined time, then recloser R2 or R4 opens at block 89. Decision block 90 determines if the line has been tested for temporary short circuits more than a predetermined number of times. If it has, then the process ends at block 88. If the line has been tested for a temporary short circuit less than a predetermined number of times then the recloser R2 or R4 is closed at block 91 and the process continues from the start bubble. If no short circuit current is detected at decision block 81, then a check is performed to determine if the line is energized for longer than a predetermined time at decision block 83. If the line is not de-energized for longer than a predetermined time, then the process continues from the start bubble. If the line is de-energized for longer than a predetermined time, then a check is made at decision block 84 to determine if the last open interval satisfies condition C2. If the last open interval satisfies condition C2, then recloser R2 or R4 is reconfigured to protect the upstream line, i.e. recloser R2 or R4 is reconfigured to protect the line between R1 and R2 or between R5 and R4. Reclosers R2 and R4 again monitor line 32 for a short circuit current at decision block 86. If a short circuit current is detected, recloser R2 and/or recloser R4 open at block 87 and the process ends at bubble 88.

However, if the condition C2 was not satisfied at decision block 84, reclosers R2 and/or R4 skip blocks 85 and 86, proceeding to block 87 where reclosers R2 and/or R4 are opened. Thus, in this instance, reclosers R2 and/or R4 immediately open and skip the steps of first configuring to protect the upstream line (block 85) and to first detect a short circuit current (block 86). The process then ends at bubble 88.

The operation of reclosers R1 and R5 in accordance with the present invention is summarized in FIG. 19. After starting at bubble 93, reclosers R1 and R5 determine if a short circuit current is present on line 32 at decision block 94. If a short circuit is present, reclosers R1 and R5 determine at decision block 95 if the short current lasts longer than a first predetermined time. If the short circuit current does not last longer than a predetermined time, then the process reverts to start bubble 93. If the short circuit current lasts longer than a predetermined time, then recloser R1 or R5 opens at block 99. Decision block 100 determines if the line has been tested for temporary short circuits more than a predetermined number of times. If it has, then the process ends at bubble 98. If the line has been tested for a temporary short circuit less than a predetermined number of times then the recloser R1 or R5 is closed at block 101 and the process continues from the start bubble. If short circuit current is not detected at decision block 94, then recloser R1 or R5 determines if the line has been de-energized for longer than a predetermined time at decision block 96. If the line has not been de-energized for longer than a predetermined time, then the process reverts to start bubble 93. If the line has been de-energized for a predetermined number of times, then recloser R1 or R5 determines if the last open interval satisfies condition C3 at decision block 102. If the last open interval does not satisfy condition C3, then the process reverts to the start bubble 93. If the last open interval satisfies condition C3 at block 102, then recloser R1 or R5 opens at block 97, and the process ends at bubble 98.

Figure 20:
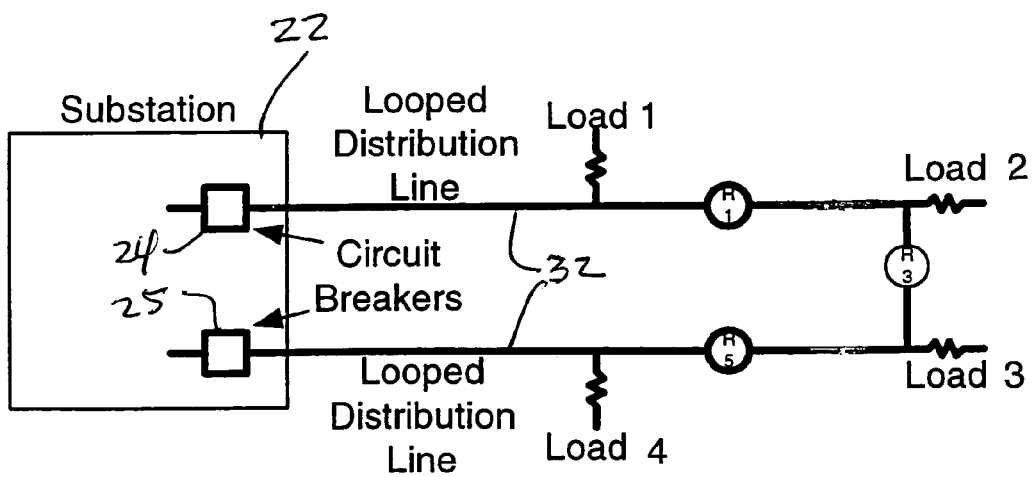
FIG. 20 illustrates a three recloser embodiment of a looped distribution system with each recloser interposed between respective loads.

It should be noted that while all of the examples shown above included five reclosers and two substation breakers, the invention is also effective at reducing stress to power system components and reducing the number of unnecessary temporary outages if there are fewer than five reclosers in the scheme. As an example, FIG. 20 shows a connection of two substation circuit breakers and three reclosers. In FIG. 20, recloser R1 and R5 operate according to the flow diagram of FIG. 19, and recloser R3 operates according to FIG. 17. The system of three reclosers shown in FIG. 20 is as effective at reducing stress on power system components and reducing the number of unnecessary temporary outages as the system of five reclosers described previously.

Moreover, many of the drawing figures illustrate a load disposed between each adjacent pair of reclosers. It will be appreciated by those skilled in the art that loads may not always be disposed in the distribution system between each adjacent pair of reclosers. Likewise, certain reclosers have been illustrated in various drawing figures as being located within a substation. Again, it will be appreciated that such reclosers are not limited to a specific location, but may be disposed at other locations in the distribution system.

Figure 14:
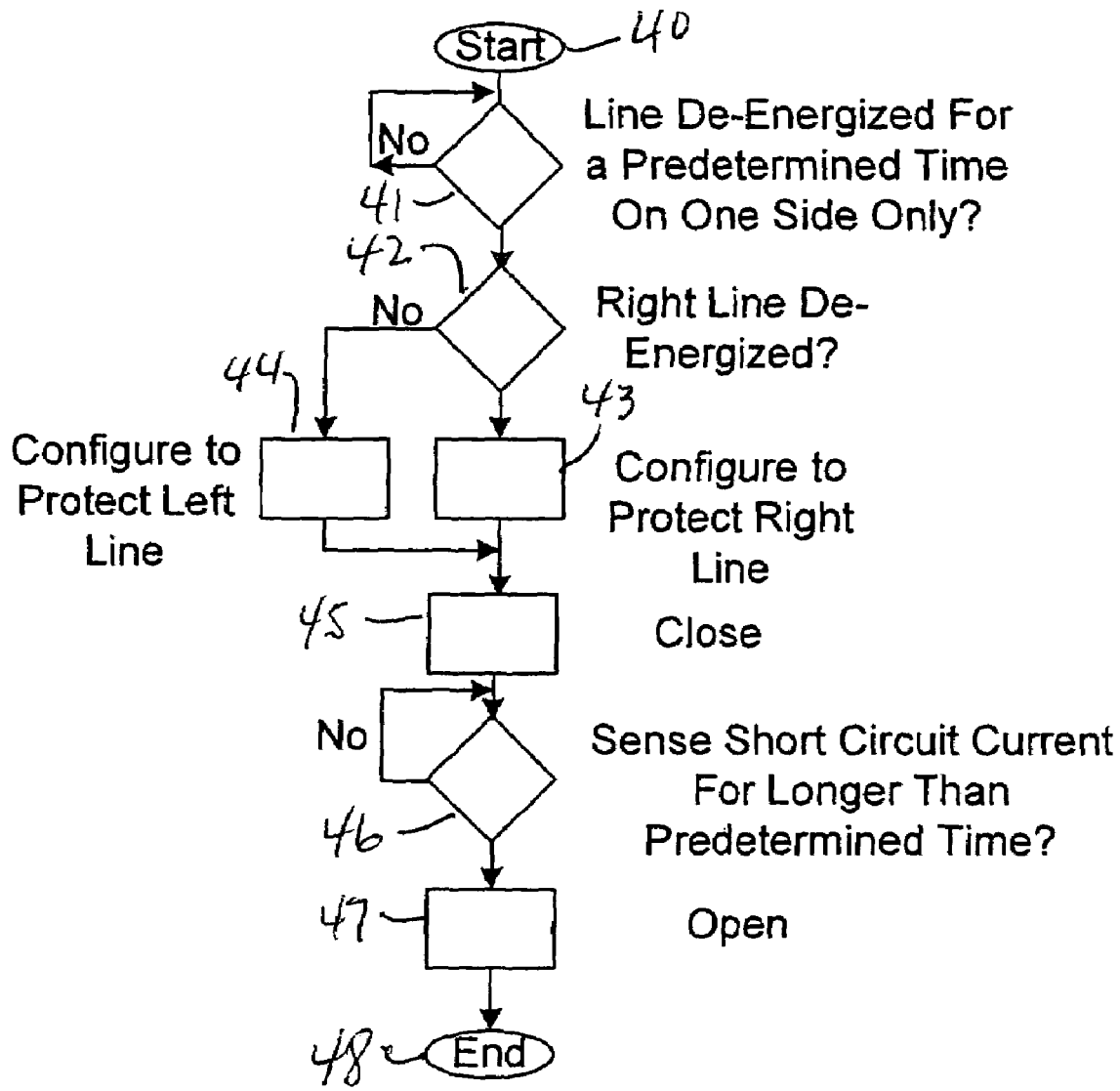
FIG. 14 is a flow chart of a preprogrammed sequence of actions that are taken by a recloser in a looped distribution system.
Figure 15:
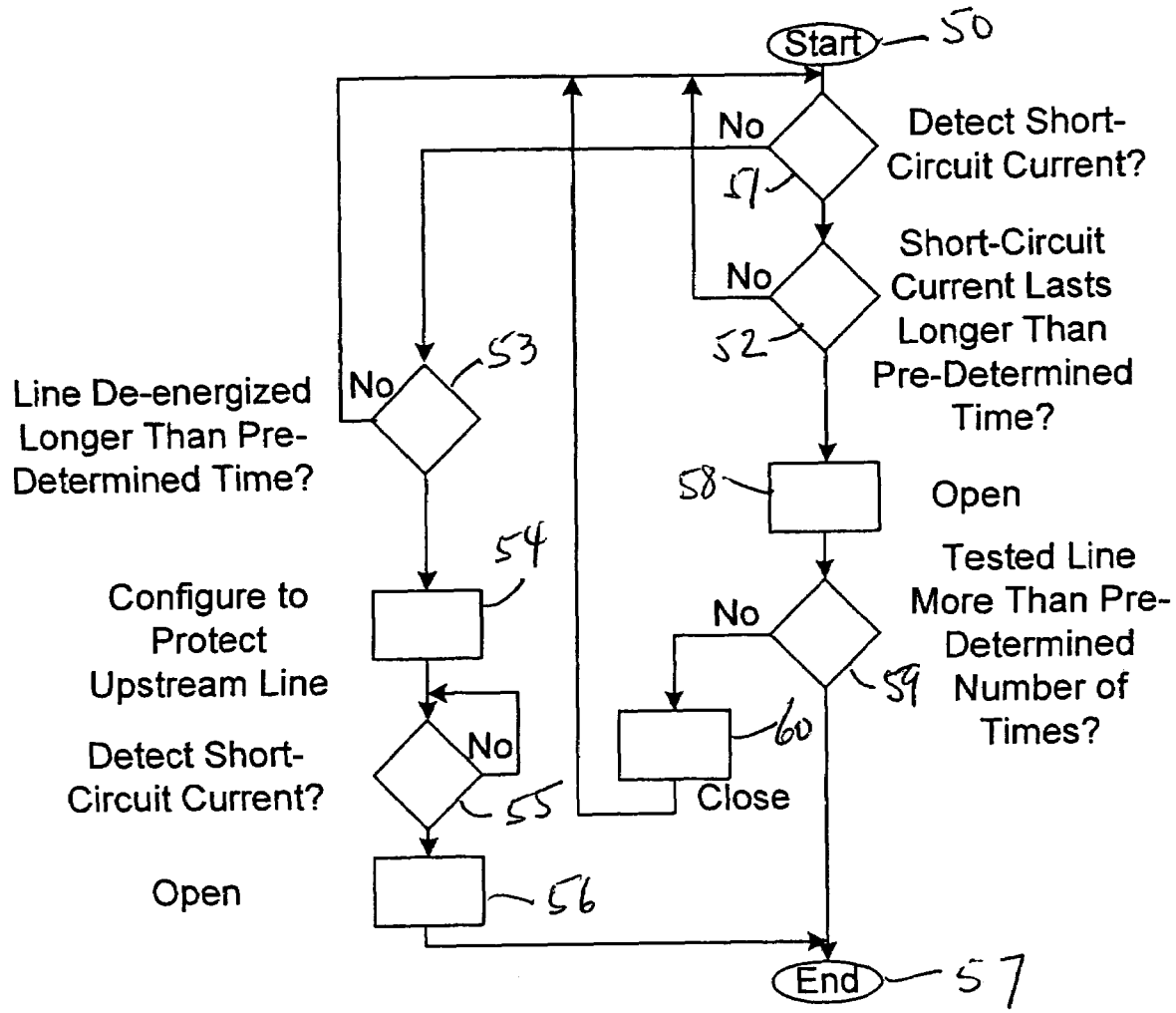
FIG. 15 is a flow chart of a preprogrammed sequence of actions that are taken by certain other reclosers in a looped distribution system.
Figure 16:
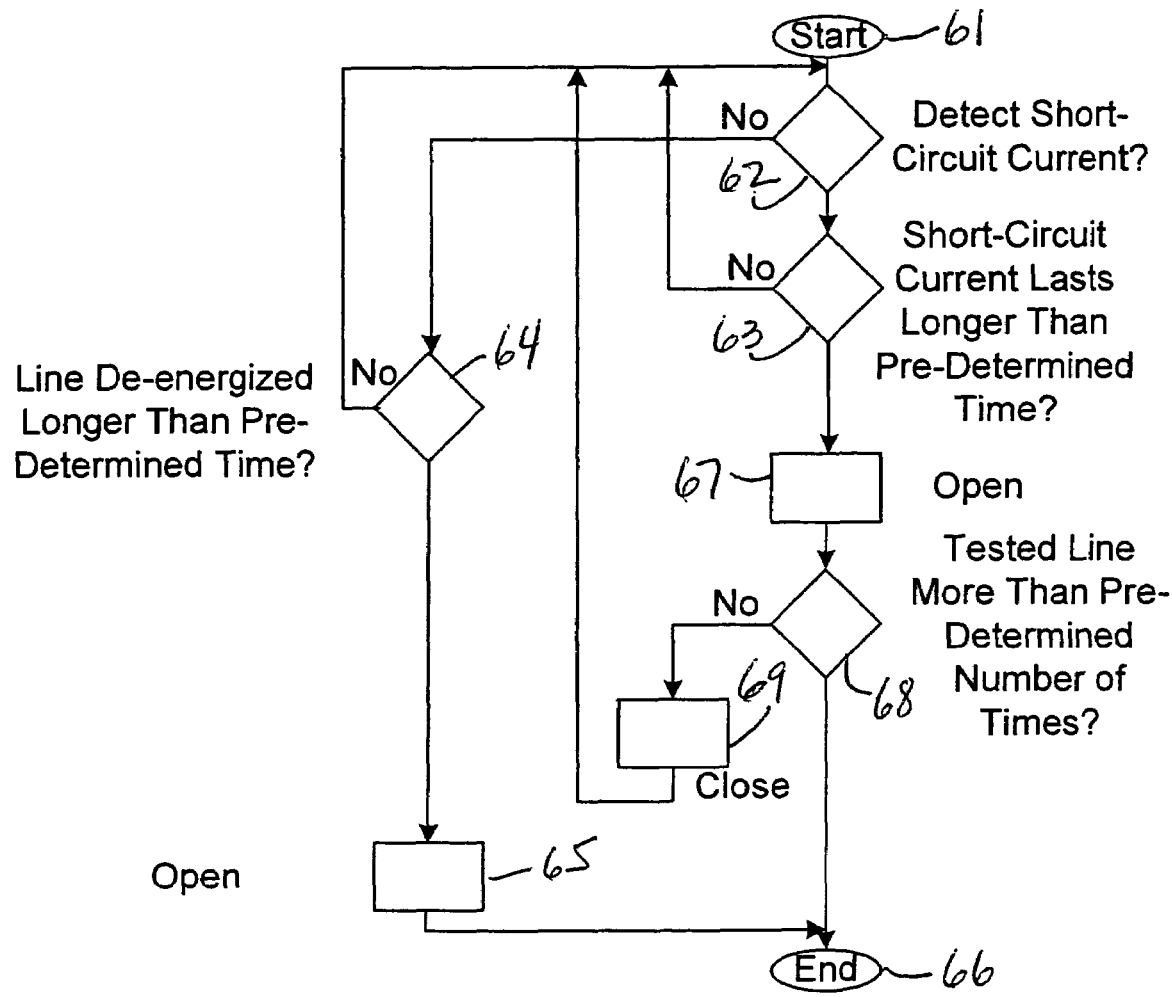
FIG. 16 is a flow chart of a preprogrammed sequence of actions that are taken by still certain other reclosers in a looped distribution system.

It will be further appreciated that, while the looped distribution systems shown in FIGS. 4-13 and 20, and the flow charts shown in FIGS. 14-16, have been indicated as prior art, the systems shown in FIGS. 4-13 and 20 and the flow charts in FIGS. 14-16 are not prior art when the circuit breakers and reclosers illustrated therein are programmed to operate in accordance with the teachings of FIGS. 17-19. Instead, such systems and flow charts then become part of the present invention.

While particular embodiments of the invention have been shown and described, it will be obvious to those skilled in the art that changes and modifications may be made therein without departing from the invention in its broader aspects.

The invention claimed is:

1. A method of sectionalizing a looped distribution line in an electric power distribution system that supplies electrical power from a source of power, said electric power distribution system including a plurality of preprogrammed switches disposed downstream from the source of power, said plurality of preprogrammed switches including a first preprogrammed switch and a fifth preprogrammed switch each disposed in the looped distribution line, a second preprogrammed switch and a fourth preprogrammed switch each disposed in the looped distribution line downstream from said first and fifth preprogrammed switches and a third preprogrammed switch disposed in the looped distribution line between said second and fourth preprogrammed switches, said third preprogrammed switch being in a normally open condition, all of said preprogrammed switches programmed to respond to the occurrence of a short circuit in the looped distribution line and to reconfigure the looped distribution line to isolate the short circuit, said method comprising the steps of:

providing some of the preprogrammed switches each with a unique open time interval, different from an open time interval of the other preprogrammed switches, for at least one of its open intervals when responding to a short circuit condition on the looped distribution line;

determining the length of said unique open time interval at at least one of the preprogrammed switches in response to the occurrence of a short circuit;

identifying that the short circuit is in a portion of the looped distribution line that is downstream from the preprogrammed switch associated with the determined unique open time interval; and changing the configuration of the other preprogrammed switches to isolate the short circuit.

2. The method of sectionalizing a looped distribution line in accordance with claim 1, wherein the step of changing the configuration of other preprogrammed switches on the looped distribution line further comprises the steps of:

opening the second preprogrammed switch upon determining that the short circuit is between the first and second preprogrammed switches;
configuring the third preprogrammed switch to protect the line between the second and third preprogrammed switches upon determining that the short circuit is between the first and second preprogrammed switches; and
closing the third preprogrammed switch.

3. The method of sectionalizing a looped distribution line in accordance with claim 1, wherein the step of changing the configuration of other preprogrammed switches on the looped distribution line further comprises the steps of:
opening the fourth preprogrammed switch upon determining that the short circuit is between the fifth and fourth preprogrammed switches; and
configuring the third preprogrammed switch to protect the line between the fourth and third preprogrammed switches upon determining that the short circuit is between the fifth and fourth preprogrammed switches; and
closing the third preprogrammed switch.

4. The method of sectionalizing a looped distribution line in accordance with claim 1, wherein the step of changing the configuration of other preprogrammed switches on the looped distribution line further comprises the steps of:
opening the first preprogrammed switch upon determining that the short circuit is upstream of the first preprogrammed switch;
configuring the third preprogrammed switch to protect the line between the second and third preprogrammed switches upon determining that the short circuit is upstream of the first preprogrammed switch; and
configuring the second preprogrammed switch to protect the line between the first and second preprogrammed switches upon determining that the short circuit is upstream of the first preprogrammed switch; and closing the third preprogrammed switch.

5. The method of sectionalizing a looped distribution line in accordance with claim 1. wherein the step of changing the configuration of other preprogrammed switches on the looped distribution line further comprises the steps of:
opening the fifth preprogrammed switch upon determining that the short circuit is upstream of the fifth preprogrammed switch;
configuring the third preprogrammed switch to protect the line between the fourth and third preprogrammed switches upon determining that the short circuit is upstream of the fifth preprogrammed switch; and
configuring the fourth preprogrammed switch to protect the line between the fifth and fourth preprogrammed switches upon determining that the short circuit is upstream of the fifth preprogrammed switch; and closing the third preprogrammed switch.

6. The method of sectionalizing a looped distribution line in accordance with claim 1, wherein the step of changing the configuration of other preprogrammed switches on the looped distribution line further comprises the step, of:
preventing the third preprogrammed switch from closing upon determining that the short circuit is between the second and third preprogrammed switch.

7. The method of sectionalizing a looped distribution line in accordance with claim 1, wherein the step of changing the configuration of other preprogrammed switches on the looped distribution line further comprises the step of:
preventing the third preprogrammed switch from closing upon determining that the short circuit is between the fourth and third preprogrammed switch.

8. The method of sectionalizing a looped distribution line in accordance with claim 1, wherein a preprogrammed switch is disposed upstream in the looped distribution line from the first preprogrammed switch and wherein the step of providing some of the preprogrammed switches with a unique open time interval further comprises the steps of:
providing the preprogrammed switch upstream of the first preprogrammed switch with a unique open time interval of time t1;
providing the first preprogrammed switch with a unique open time interval of time t2, with t2 greater than t1; and
providing the second preprogrammed switch with a unique open time interval of time t3, with t3 greater than t2.

9. The method of sectionalizing a looped distribution line in accordance with claim 8, wherein the step of determining the length of said unique open time interval at each of the preprogrammed switches further comprises the step of:
determining if the open interval used to test the line for a temporary short circuit is greater than a time that is less than time t1.

10. The method of sectionalizing a looped distribution line in accordance with claim 8, wherein the step of determining the length of said unique open time interval at each of the preprogrammed switches further comprises the step of:
determining if the open interval used to test the line for a temporary short circuit is less than a time that is both greater than time t1 and less than time t2.

11. The method of sectionalizing a looped distribution line in accordance with claim 8, wherein the step of determining the length of said unique open time interval at each of the preprogrammed switches further comprises the step of:
determining if the open interval used to test the line for a temporary short circuit is less than a time that is both less than time t3 and greater than time t2.

12. The method of sectionalizing a looped distribution line in accordance with claim 1, wherein another preprogrammed switch is disposed upstream in the looped distribution line from the fifth preprogrammed switch and wherein the step of providing some of the preprogrammed switches with a unique open time interval further comprises the steps of:
providing the preprogrammed switch upstream from the fifth preprogrammed switch with a unique open time interval of time t1';
providing the fifth preprogrammed switch with a unique open time interval of time t2', with t2' greater than t1'; and
providing the fourth preprogrammed switch with a unique open time interval of time t3', with t3' greater than t2'.

13. The method of sectionalizing a looped distribution line in accordance with claim 12, wherein the step of determining the length of said unique open time interval at each of the preprogrammed switches further comprises the step of:
determining if the open interval used to test the line for a temporary short circuit is greater than a time that is less than time t1'.

14. The method of sectionalizing a looped distribution line in accordance with claim 12, wherein the step of determining the length of said unique open time interval at each of the preprogrammed switches further comprises the step of:
determining if the open interval used to test the line for a temporary short circuit is less than a time that is both greater than time t1' and less than time t2'.

15. The method of sectionalizing a looped distribution line in accordance with claim 12, wherein the step of determining at each preprogrammed switch the length of said open interval further comprises the step of:

determining if the open interval used to test the line for a temporary short circuit is less than a time that is both less than time t3' and greater than time t2'.

16. A method of sectionalizing a looped distribution line in an electric power distribution system that supplies electrical power from a source of power, said electric power distribution system including a plurality of preprogrammed switches disposed downstream from the source of power on the looped power distribution line, one of the preprogrammed switches being in a normally open condition, all of said preprogrammed switches programmed to respond to the occurrence of a short circuit in the looped distribution line and to reconfigure the looped distribution line to isolate the short circuit, said method comprising the steps of:

providing some of the plurality of preprogrammed switches each with a unique open time interval, different from an open time interval of the other preprogrammed switches, for at least one of its open intervals when responding to a short circuit condition on the looped distribution line;

determining at at least one of the plurality of preprogrammed switches the length of said unique open time interval in response to the occurrence of a short circuit;

identifying that the short circuit is in a portion of the looped distribution line that is protected by the preprogrammed switch associated with the determined unique open time interval; and changing the configuration of other preprogrammed switches on the looped distribution line to isolate the short circuit.

17. The method of sectionalizing a looped distribution line in accordance with claim 16, wherein the step of changing the configuration of other preprogrammed switches further comprises the steps of:

opening a preprogrammed switch that is disposed adjacent to said normally open preprogrammed switch upon determining that the short circuit is upstream of the adjacent preprogrammed switches; and configuring the normally open preprogrammed switch to protect the line between the adjacent and the normally open preprogrammed switches; and closing the normally open preprogrammed switch after the adjacent switch has opened.

18. The method of sectionalizing a looped distribution line in accordance with claim 16, wherein the step of changing the configuration of other preprogrammed switches on the looped distribution line further comprises the step of:

preventing the normally open preprogrammed switch from closing upon determining that the short circuit is between the normally open preprogrammed switch and the preprogrammed switch adjacent to the normally open preprogrammed switch.

19. The method of sectionalizing a looped distribution line in accordance with claim 16, wherein the step of providing each preprogrammed switch with a unique open time interval further comprises the steps of:

providing the preprogrammed switch in the looped distribution line that protects the section of line directly upstream of the preprogrammed switch that is adjacent to the normally open preprogrammed switch with a unique open time interval of time t1; and providing the preprogrammed switch adjacent to the normally open preprogrammed switch with a unique open time interval of time t2, with t2 greater than t1.

20. The method of sectionalizing a looped distribution line in accordance with claim 19, wherein the step of determining at each of the plurality of preprogrammed switches the length of said unique open time interval further comprises the step of:

determining if the open interval used to test the line for a temporary short circuit is greater than a time that is less than time t1.

21. The method of sectionalizing a looped distribution line in accordance with claim 19, wherein the step of determining at each of the plurality of preprogrammed switches the length of said unique open time interval further comprises the step of:

determining if the open interval used to test the line for a temporary short circuit is less than a time that is both less than time t2 and greater than time t1.

22. A system for sectionalizing a looped distribution line in an electric power distribution system that supplies electrical power from a source of power, said system comprising:

a plurality of preprogrammed switches disposed in the looped distribution line, one of the preprogrammed switches being in a normally open condition, some of said plurality of preprogrammed switches programmed to respond to the occurrence of a short circuit in the looped distribution line and to reconfigure the looped distribution line to isolate the short circuit, some of said plurality of preprogrammed switches each provided with a unique open time interval different from an open time interval of the other preprogrammed switches, for at least one of its open intervals when responding to a short circuit condition on the looped distribution line; and at least one of said plurality of preprogrammed switches capable of determining the length of said unique open time interval in response to the occurrence of a short circuit to identify that the short circuit is in a portion of the looped distribution line that is downstream from the preprogrammed switch associated with the determined unique open time interval;

whereby the preprogrammed switch next downstream of the preprogrammed switch with the determined unique open time interval is reconfigured to isolate the short circuit.

23. The system for sectionalizing a looped distribution line in accordance with claim 22, said system further comprising:

a preprogrammed switch disposed adjacently to said normally open preprogrammed switch that opens upon determining that the short circuit is upstream of the adjacent preprogrammed switch;

the normally open preprogrammed switch configures to protect the line between the adjacent and the normally open preprogrammed switches; and the normally open preprogrammed switch closes after the adjacent switch has opened.

24. The system for sectionalizing a looped distribution line in accordance with claim 22, said system further comprising:

a first preprogrammed switch disposed most upstream in the looped distribution line, said first preprogrammed switch provided with a unique open time interval of time t1;

a second preprogrammed switch disposed next downstream in the looped distribution system from the first preprogrammed switch, said second preprogrammed switch provided with a unique open time interval of time t2, with t2 greater than t1; and a third preprogrammed switch disposed next downstream in the looped distribution system from the second preprogrammed switch, said third preprogrammed switch provided with a unique open time interval of time t3, with 13 greater than t2.

25. The system for sectionalizing a looped distribution line in accordance with claim 24, wherein at least one of the preprogrammed switches determines if the open interval used to test the line for a temporary short circuit is greater than a time that is less than time t1.

26. The system for sectionalizing a looped distribution line in accordance with claim 24, wherein at least one of the preprogrammed switches determines if the open interval used to test the line for a temporary short circuit is less than a time that is both greater than time t1 and less than time t2.

27. The system for sectionalizing a looped distribution line in accordance with claim 24 wherein the normally opened preprogrammed switch determines if the open interval used to test the line for a temporary short circuit is less than a time that is both less than time t3 and greater than time t2.

28. A system for sectionalizing a looped distribution line in an electric power distribution system that supplies electrical power from a source of power, said system comprising:
   a plurality of preprogrammed switches disposed in the looped distribution line downstream from the source of power,
   some of said plurality of preprogrammed switches programmed to respond to the occurrence of a short circuit in the looped distribution line each with an a unique open time interval different from an open time interval of the other preprogrammed switches, for at least one of its open intervals;
   at least one of said plurality of preprogrammed switches capable of determining which preprogrammed switch opened in response to the occurrence of a short circuit by determining the unique open time interval of the preprogrammed switch that opened;
   identifying that the short circuit is in a portion of the looped distribution line that is protected by the preprogrammed switch associated with the determined unique open time interval; and
   changing the configuration of other preprogrammed switches on the looped distribution line to isolate the short circuit.

29. A method of sectionalizing a looped distribution line in an electric power: distribution system that supplies electrical power from a source of power, said electric power distribution system including a plurality of preprogrammed switches disposed in the looped distribution line downstream from the source of power, said method comprising the steps of:
   providing some of the plurality of preprogrammed switches each with an a unique open time interval different from an open time interval of the other preprogrammed switches, for at least one of its open intervals when responding to a short circuit condition on the looped distribution line;
   determining the length of said unique open time interval by at least one of said plurality of preprogrammed switches in response to the occurrence of a short circuit; identifying that the short circuit is in a portion of the looped distribution line that is protected by the preprogrammed switch associated with the determined unique open time interval; and
   changing the configuration of other preprogrammed switches on the looped distribution line to isolate the short circuit.

30. The method of sectionalizing a looped distribution line in accordance with claim 29, said method comprising the additional step of:
   identifying the preprogrammed switch associated with the determined unique open time interval.

31. The method of sectionalizing a looped distribution line in accordance with claim 30, said method comprising the additional step of:
   identifying that the short circuit is in a portion of the looped distribution line that is downstream from the preprogrammed switch associated with the determined unique open time interval.

* * * * *